US00RE37662E

(19) United States
(12) Reissued Patent
Uchida et al.

(10) Patent Number: US RE37,662 E
(45) Date of Reissued Patent: Apr. 16, 2002

(54) COIN RECEIVING AND DISPENSING APPARATUS

(75) Inventors: Toshio Uchida; Noboru Ichihara, both of Tokyo (JP)

(73) Assignee: Asahi Seiko Kabushiki Kaisha, Tokyo (JP)

(21) Appl. No.: 09/168,346

(22) Filed: Oct. 7, 1998

Related U.S. Patent Documents

Reissue of:
(64) Patent No.: 5,562,536
Issued: Oct. 8, 1996
Appl. No.: 08/438,485
Filed: May 10, 1995

(30) Foreign Application Priority Data

May 12, 1994 (JP) ..... 6-123019

(51) Int. Cl.[7] ..... G07D 3/06
(52) U.S. Cl. ..... 453/9; 453/12
(58) Field of Search ..... 452/9–13, 20, 452/21, 32–35, 40, 41, 49, 57

(56) References Cited

U.S. PATENT DOCUMENTS 3,590,833 A * 7/1971 Walton ..... 453/9 X
3,771,538 A * 11/1973 Reis ..... 453/12
3,785,386 A * 1/1974 Kofsky ..... 453/9
4,102,110 A * 7/1978 Iizuka et al. ..... 453/9 X
4,167,949 A * 9/1979 Hashimoto et al. ..... 453/12
4,178,502 A * 12/1979 Zimmermann ..... 453/9 X
5,059,153 A * 10/1991 Goi ..... 453/11
5,295,899 A * 3/1994 Adams et al. ..... 453/10

FOREIGN PATENT DOCUMENTS

EP 0295862 * 12/1988 ..... 453/11
GB 2045502 * 10/1980 ..... 453/10

* cited by examiner

*Primary Examiner*—F. J. Bartuska
(74) *Attorney, Agent, or Firm*—Sughrue, Mion, Zinn, Macpeak & Seas, PLLC

(57) ABSTRACT

A coins receiving and dispensing apparatus suitable for food shops or restaurants allows precise transfer and reception of various coins without error and confirmation of the balance of the coin. When coins received from customers are inserted into this apparatus, the coins are immediately sorted by a sorting mechanism with respect to the denominations of the currency and stored at the respective storage portions. When the coins are paid out as change, the coin feeder operates based on a dispensing command signal produced corresponding to the differences between the sold amount inputted in the register and the received amount from the customers to feed the coins of the wanted denomination in the necessary number.

19 Claims, 20 Drawing Sheets

COIN RECEIVING AND DISPENSING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a coin receiving and dispensing apparatus suitably installed at food shops or fast-food restaurants.

2. Description of Related Art

In shops, cashiers these days operate their registers to record the prices of goods that the customers are purchasing, further putting them in the registers according to the denominations of the currency after counting and sorting the paid currency, as well as taking out respective necessary bills and coins to transfer as change.

However, such bothersome monetary reception from and transfer to many customers consumes a relatively large amount of time in association with recording task of sold amounts of money on the register through key typing inputs or bar code inputs, thereby raising problems in that it creates long lines waiting for cashiers when busy. In particular, the problems are inevitable when a person unfamiliar with operating the register is the cashier, thereby resulting in the transfer of improper change to the customer.

In many situations, the currency received from the customers and placed into the registers is used as change. It is therefore difficult to determine the balance in the respective registers during their operation, so that calculation of the proceeds and collection of the money takes a long time when the register is closed or during the cashier's break.

SUMMARY OF THE INVENTION

It is an object of the invention to provide a coin receiving and dispensing apparatus enabling an operator to quickly, unmistakably perform the transfer of currency with customers and to confirm its balance immediately.

The foregoing object is accomplished with a coin receiving and dispensing apparatus including: a plurality of storage portions for storing of respective coins; sorting means for sorting coins inserted from the outside of the apparatus with respect to denominations of the currency of the coin and respectively feeding the sorted coins to said corresponding storage portions; feeding means for feeding wanted coins out of said storage portions in response to a dispensing command; and said sorting means comprising a gauge having a coin guide portion extending over said storage portions, said coin guide portion being formed with a plurality of openings respectively having inner diameters slightly larger than the diameter of a corresponding one of the coins among the various coins at positions corresponding to said respective storage portions, and comprising conveying means for conveying the coins that have reached on said gauge along the coin guide portion.

In accordance with the coin receiving and dispensing apparatus thus constituted, coins inserted through a coin entry opening are sorted by the sorting means with respect to the denominations of the currency and stored at the respective storage portions. When the coins are paid out, the feeding means operates based on a delivery signal sent from the register or the like to feed the coins of the wanted denominations in the necessary number.

BRIEF DESCRIPTION OF THE DRAWINGS

The above and other objects and features of the invention are apparent to those skilled in the art from the following preferred embodiments thereof when considered in conjunction with the accompanying drawings, in which.

DETAILED DESCRIPTION OF THE PREFERRED EMBODIMENTS

Figure 1:
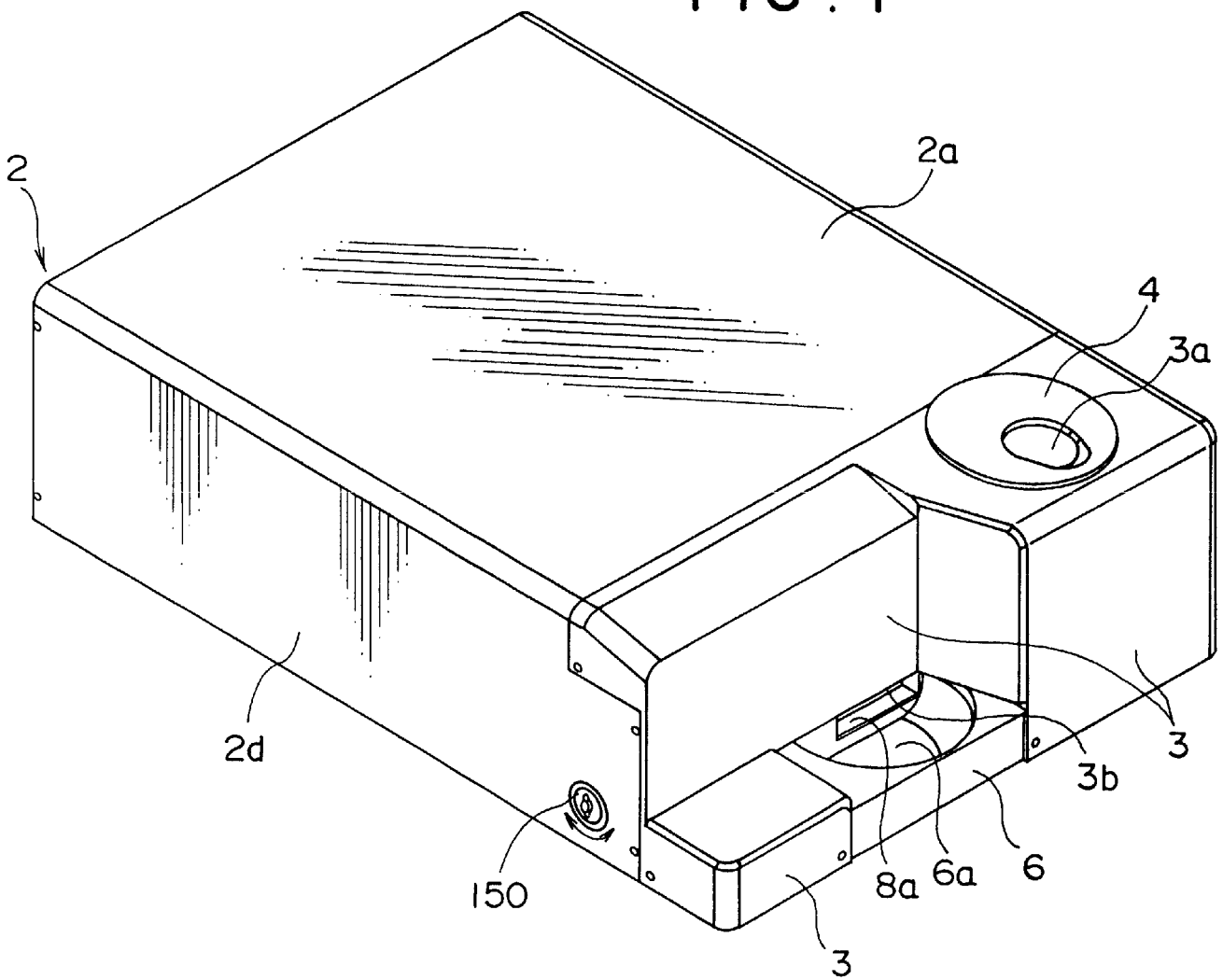
FIG. 1 is a perspective view showing the entire appearance of the coin receiving and dispensing apparatus of a preferred embodiment according to the invention.
Figure 2:
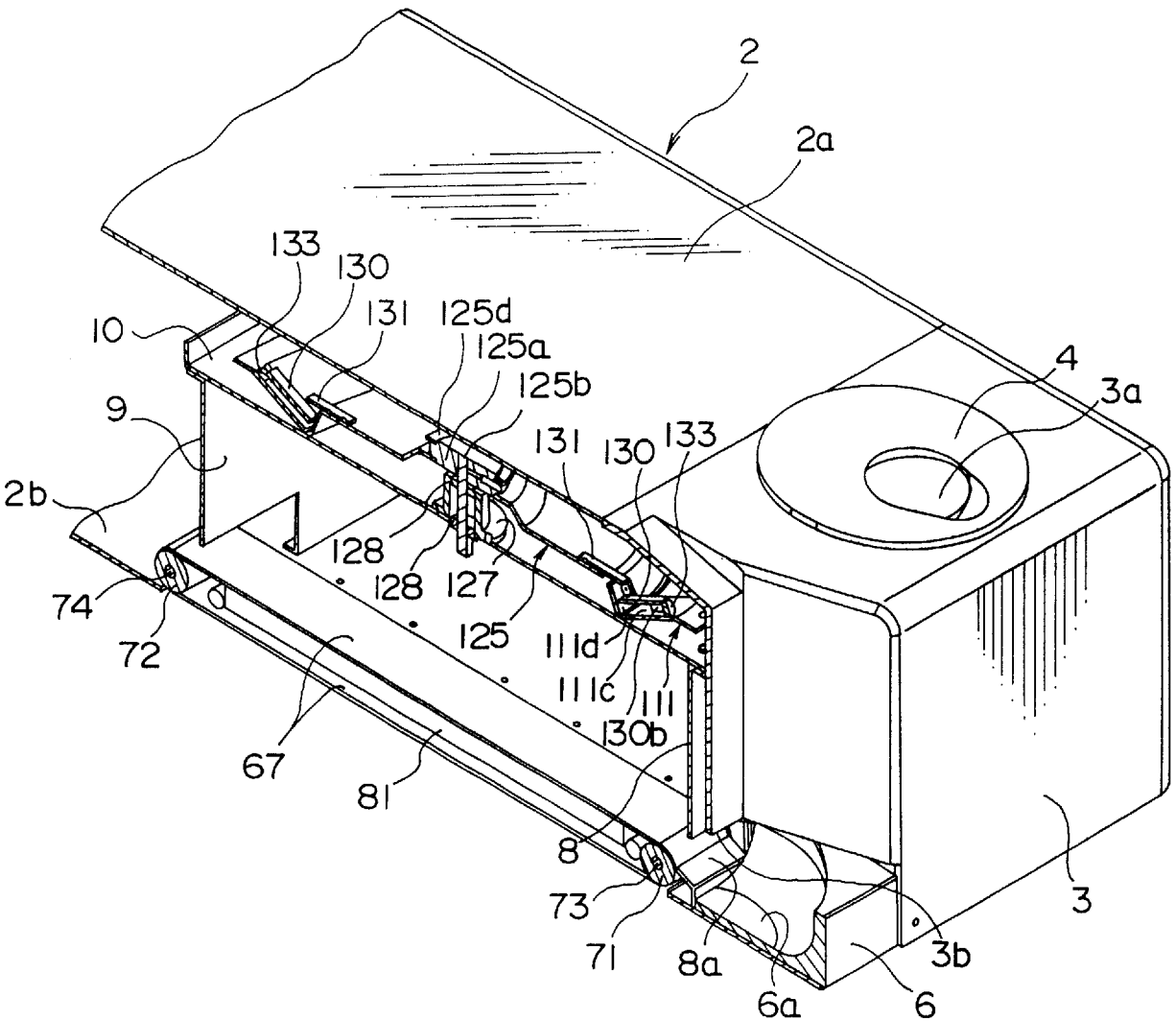
FIGS. 2, 3 are perspective and side views, respectively, showing a part including a cross section of the coin receiving and dispensing apparatus shown in FIG. 1.
Figure 3:
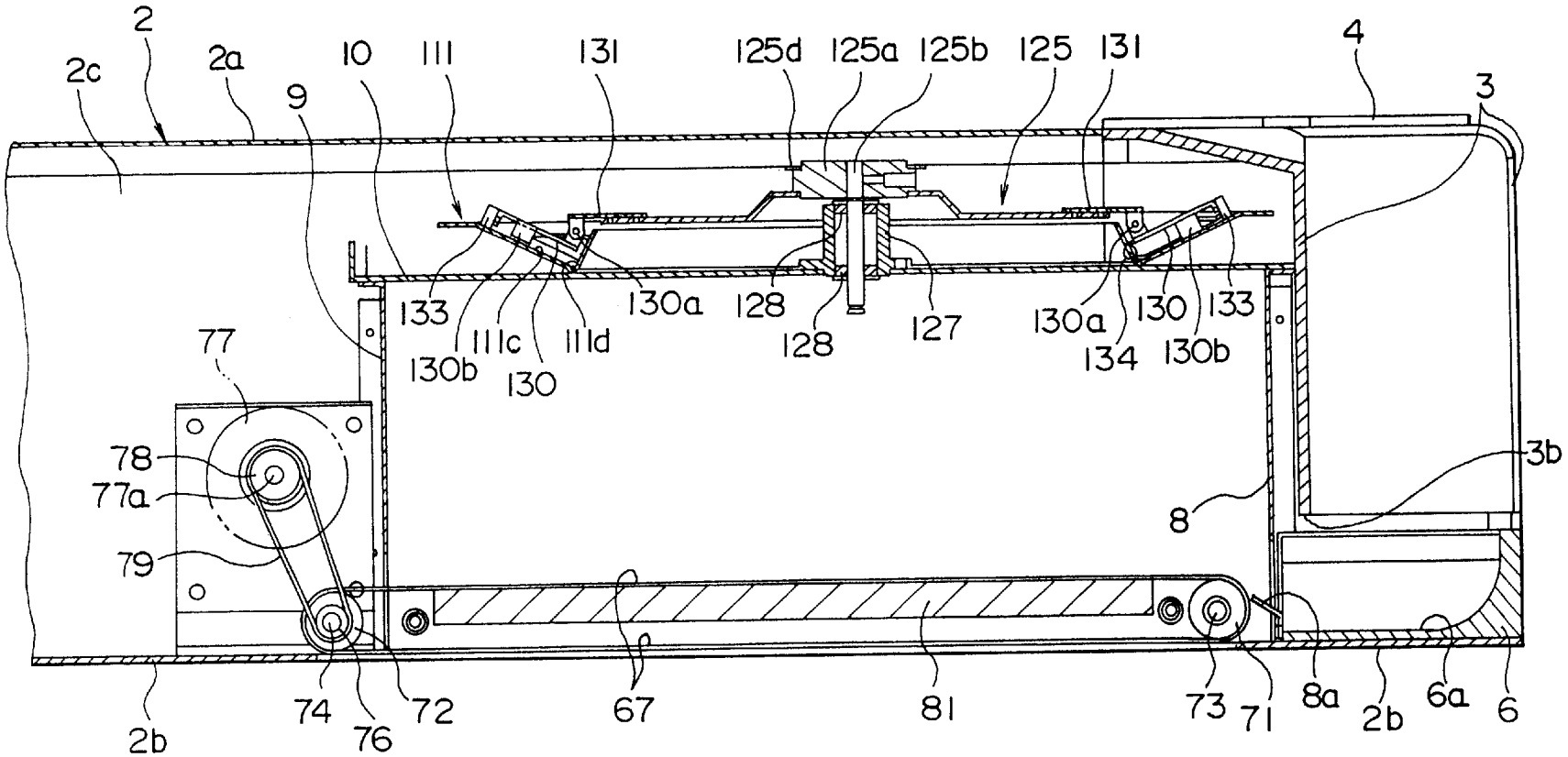

Referring to the drawings in detail, in particular, to FIGS. 1 to 3, a coin receiving and dispensing apparatus of a preferred embodiment according to the invention is shown. As shown in FIGS. 1 to 3, the coin receiving and dispensing apparatus has a casing 2 formed in a substantially rectangular block shape as a whole, and a front panel 3 arranged at the front side of the casing 2. As apparent from FIGS. 1 to 3 and also FIG. 4, the casing 2 is constituted of a top plate 2a, a bottom plate 2b, left and right side plates 2c, 2d, and a rear plate 2e, which are assembled to each other using small screws or the like.

A coin entry opening 3a for inserting coins into this apparatus is formed in the top plate 2a on a right upper side of the front panel 3; a disc-shaped coin receiving plate 4 is attached on the top plate 2a so as to surround the coin entry opening 3a. A delivery slot 3b for dispensing coins to be dispensed from the apparatus is formed at a lower portion of the front panel 3; a payout tray 6 formed with a recess 6a is arranged at the delivery slot 3b; coins, when discharged, remain at the recess 6a. The coins that have reached the recess 6a will be picked up by an operator, for example, a cashier, and be given as change to customers.

An inside mechanism surrounded by the casing 2 and a front panel 3 is described as follows. As apparent from FIGS. 2 to 5, specifically from FIG. 4, a pair of plate shaped upright frames 8, 9 is attached on the bottom plate 2b constituting the bottom of the casing 2 so as to be in parallel to each other and to extend crosswise on rear and front sides. A horizontal frame 10 similarly in a plate shape bridges the tops of both upright frames 8, 9.

Figure 4:
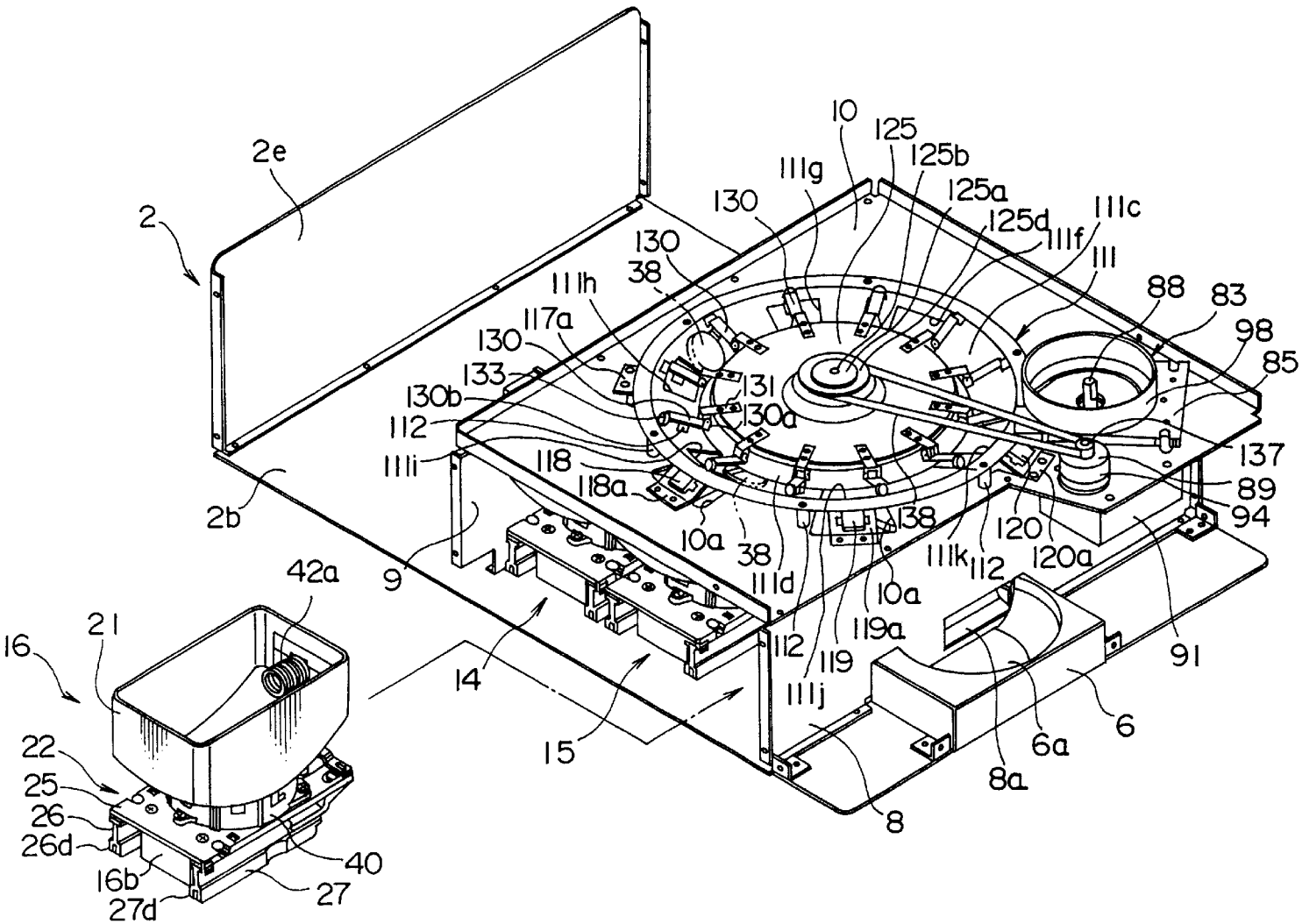
FIGS. 4, 5 are perspective and plan views showing an inside mechanism and a part of the inside mechanism, respectively, of the coin receiving and dispensing apparatus shown in FIG. 1.
Figure 5:
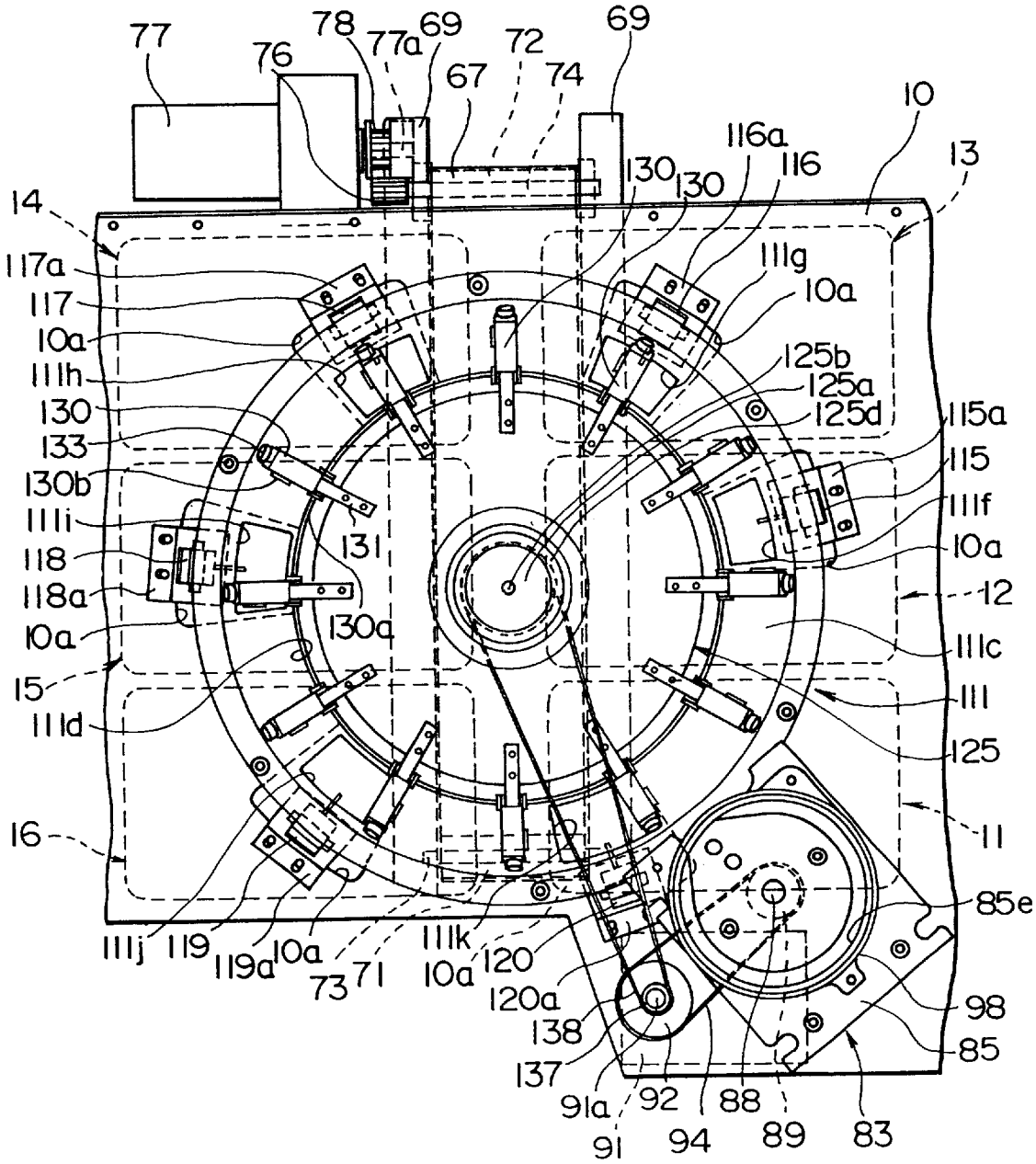

As shown in FIGS. 4, 5, six coin feeders 11 to 16 are arranged in a space defined by the both upright frames 8, 9 and the horizontal frame 10 on the bottom plate 2b. Specifically, as shown in FIG. 5, those coin feeders 11 to 16 am aligned in two lines, a right line and a left line, in each of which three coin feeders are aligned in a back and forth direction. The coin feeders 11 to 16 are detachably attached to the bottom plate 2b. Notedly, the coin feeders 11 to 16 are not shown in FIGS. 2, 3. A detailed description of the constitution of the coin feeders 11 to 16 is accomplished by a description of only the coin feeder 16 for the sake of brevity, since the other feeders have substantially same constitution.

Figure 6:
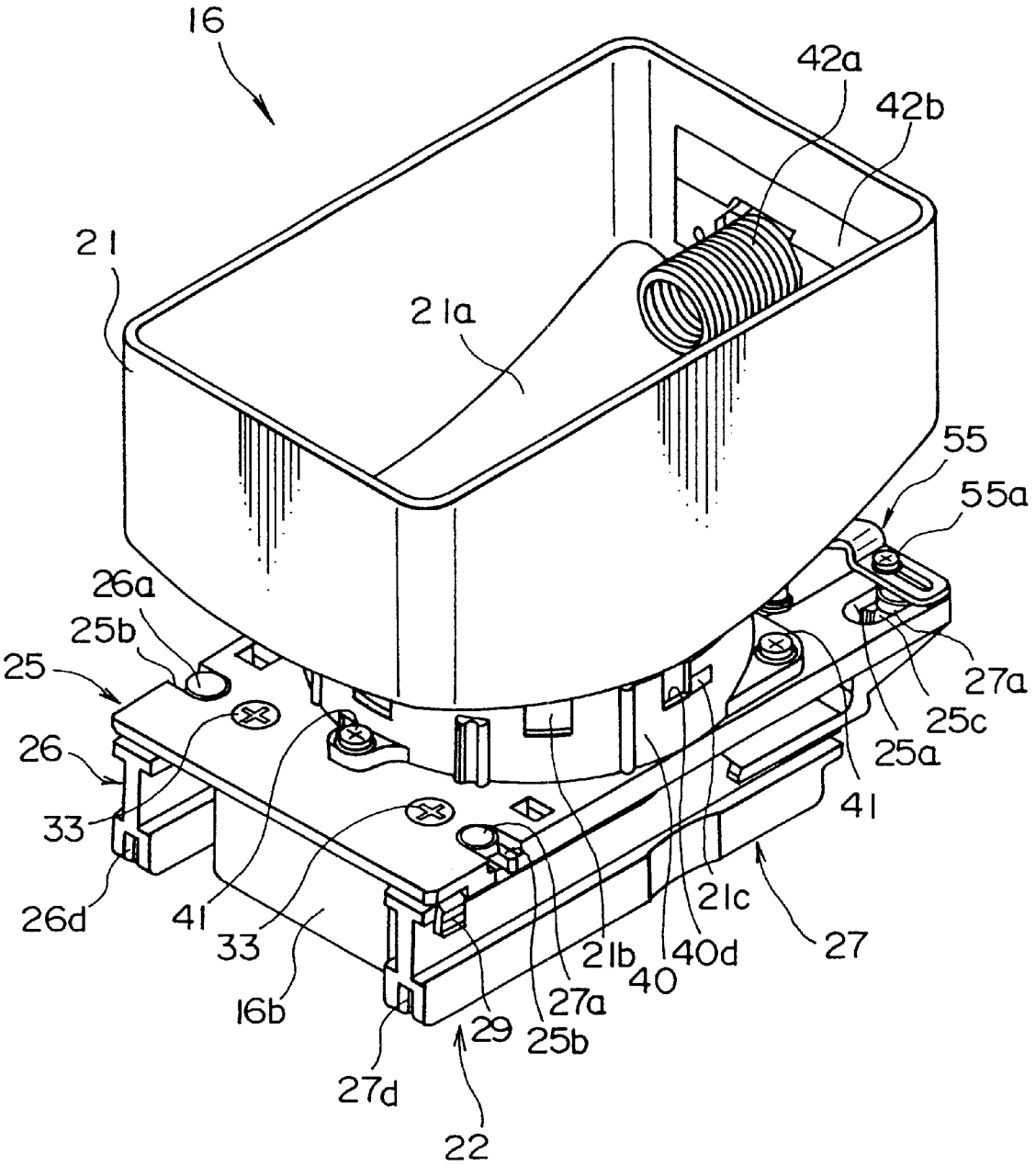
FIG. 6 is a perspective view showing a coin feeder included in the inside mechanism shown in FIG. 4.

As shown in FIGS. 4, 6, the coin feeder 16 has a hopper 21 serving as a storage portion capable of collecting and storing many coins and a transfer unit 22 for feeding wanted coins from the hopper 21 in response to payout commands as described below. Specifically, the coin feeder 16 stores, for example, the 10 yen coins in the hopper 21 thereof and feeds out the 10 yen coins by operation of the transfer unit 22 thereof. The other coin feeders 11 to 15 store the 500 yen coins, the 1 yen coins, the 50 yen coins, the 5 yen coins, and the 100 yen coins, respectively, in the respective hoppers 21 built thereto and feed out the respective coins upon the dispensing commands by the transfer units provided thereto, respectively. It may be needless to say that when another currency is used, the coin feeders can store different coins according to the currency in use. The hopper 21 is formed in a rectangular shape as a whole, and its bottom 21a is inclined to smoothly dispense the stored 10 yen coins along the inclined bottom 21a.

Figure 8:
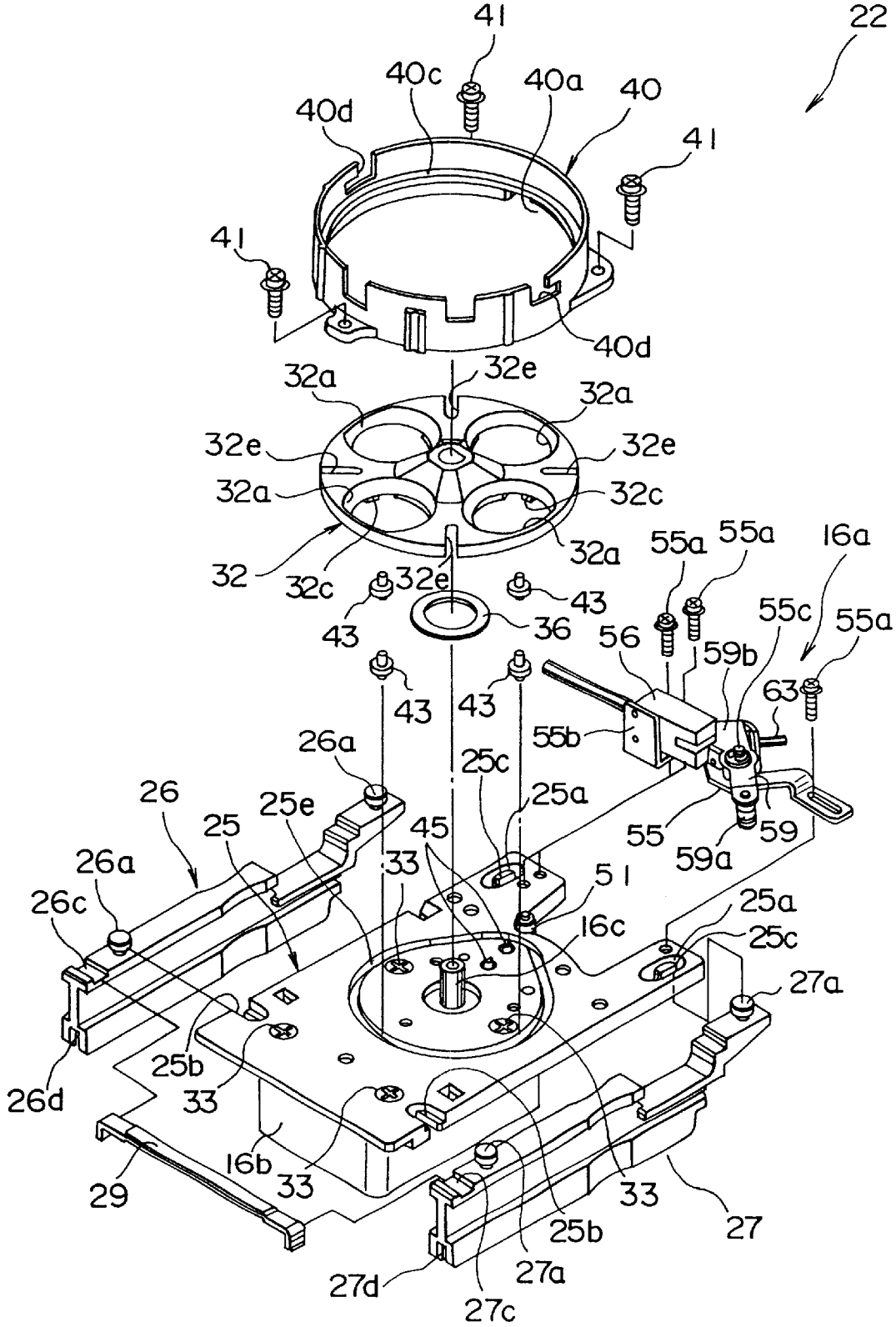

The transfer unit 22 for feeding the 10 yen coins stored in the hopper 21 is constituted as follows. As shown in FIGS. 6, 8, the transfer unit 22 has a base plate 25 formed in a substantially rectangular shape. The base plate 25 slidably supports the 10 yen coins. A pair of leg members 26, 27 are attached to the bottom face on both side ends of the base plate 25. Specifically, attachment pins 26a, 27a, two pieces each, are attached to both ends on the top of the leg members 26, 27, respectively. Those attachment pins 26a, 27a are fitted to long holes 25a and cut portions 25b respectively provided near corners at the longer edges of the base plate 25. Inside the long hole 25a provided is a flexible projection 25c. The projection 25c engages one of the attachment pins 26a, 27a fitted into the long holes 25a, thereby preventing the attachment pins 26a, 27a from disengaging with the long holes 25a. A leaf spring 29 is provided at a shorter edge of the base plate 25 so as to extend along the shorter edge. The leaf spring 29 contacts tile bottom face of tile base plate 25 along the shorter edge of the base plate 25. Both ends of the leaf spring 29 are bent downward to form small L-shapes and engage with recesses 26c, 27c formed on the top corner of the leg members 26, 27. That is, the leaf spring 29 urges the attachment pins 26a, 27a to the cut portions 25b by its elastic force. With such constitution, if the leaf spring 29 is made to bend in opposition to its elastic force to disengage itself from the recesses 26c, 27c and the projections 25c in the long holes 25a are similarly bent to disengage themselves from the attachment pins 26a, 27a, the attachment pins 26a, 27a are easily pulled out of the long holes 25a and cut portions 25b, so that both leg members 26, 27 can be separated from the base plate 25. When both leg members 26, 27 are to be attached, no other step except the reversing steps is needed.

Guide grooves 26d, 27d are formed at the bottom of both leg members 26, 27 across the entire length of the leg members 26, 27. As described above, the coin feeder 16, as the well as other coin feeders 11 to 15, is detachably attached to the bottom plate 2b of the casing 2, and the guide grooves 26d, 27d are formed for detachably attaching the feeder 16. That is, a pair of guide rails (not shown) slidably fitted to the guide grooves 26d, 27d is provided on the bottom plate 2b. Inserting horizontally the coin feeder 16 as shown in FIG. 4 allows the guide grooves 26d, 27d to fit on the guide rails. Stopper pins (not shown) are formed near rear portions in the inserting direction of both guide grooves 26d, 27d; the guide rails are formed with dimples or recesses placed at positions corresponding to the stopper pins, respectively; the coin feeder 16 is securely positioned at the predetermined position by engaging the stopper pins with the dimples or recesses. When the coin feeder 16 is taken out of the apparatus, the rear end of the coin feeder 16 is slightly lifted to disengage the stopper pins from the dimples or recesses, and then, the coin feeder 16 can be pulled, as it is, to be isolated from the casing 2.

Figure 9:
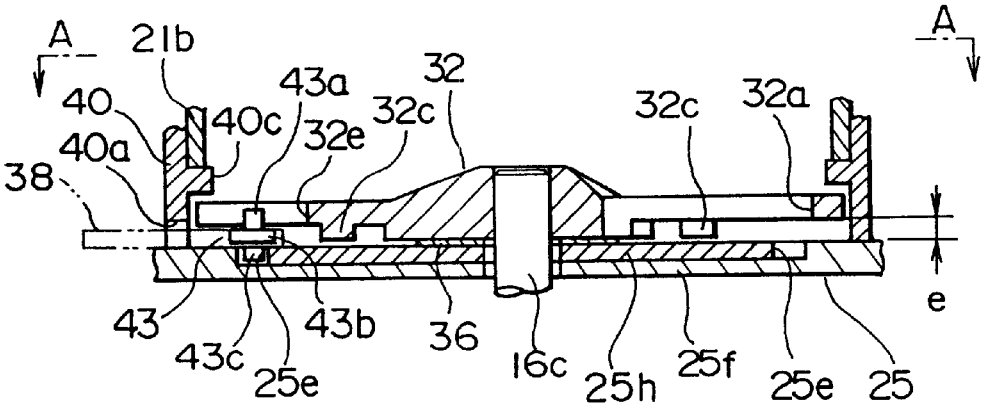
FIG. 9 is a vertical cross section showing a part of the coin feeder shown in FIG. 6.
Figure 10:
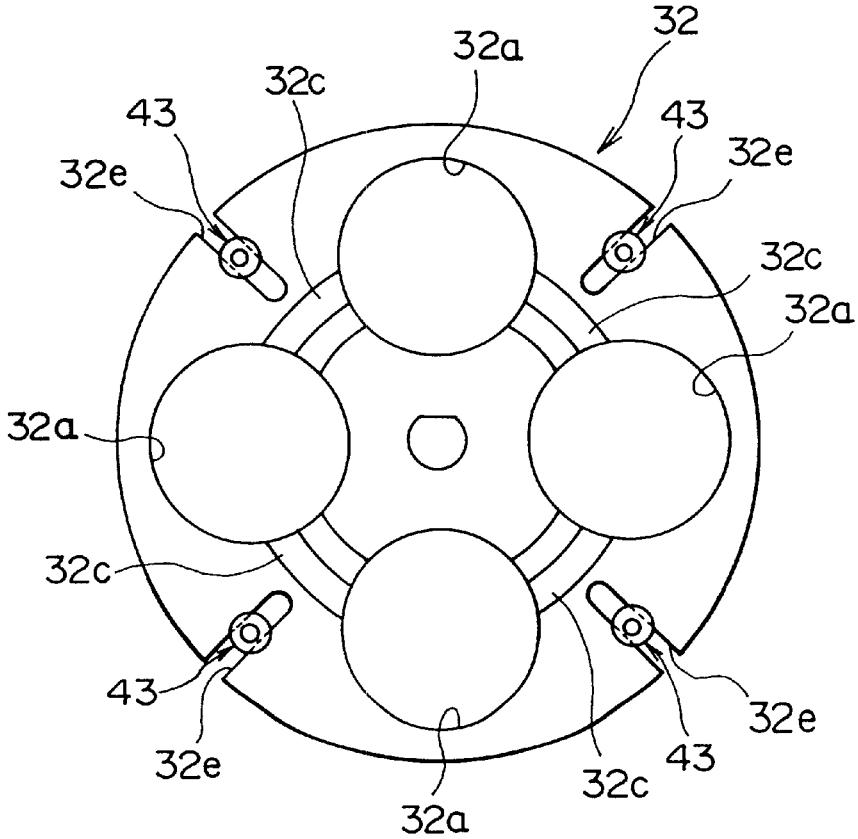
FIG. 10 is a bottom view showing a rotation plate with which the coin feeder shown in FIG. 6 is equipped.
Figure 11:
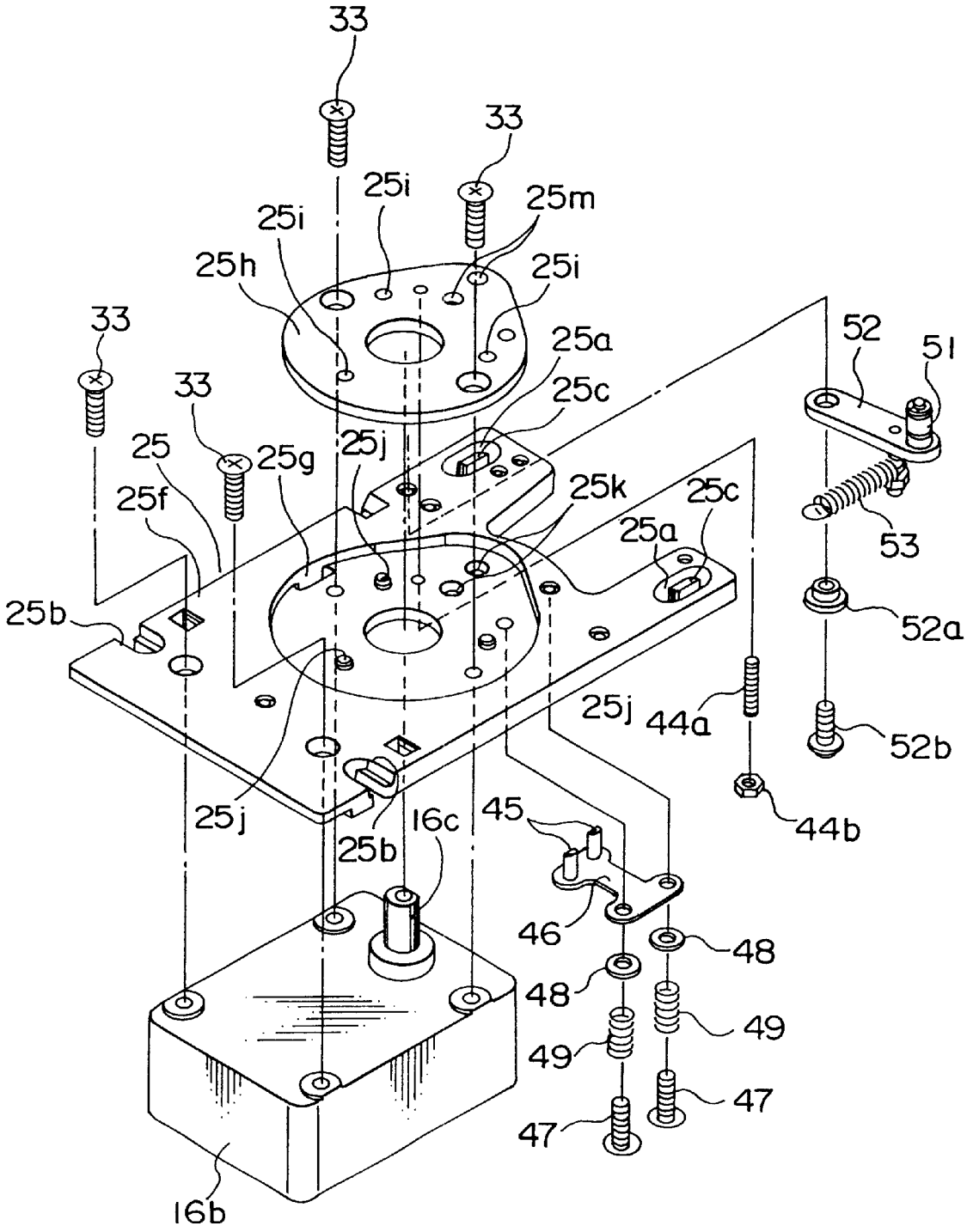
FIG. 11 is an exploded perspective view showing a part of the coin feeder shown in FIG. 6.

As shown in FIGS. 8, 9, a disc shaped rotation plate 32 is arranged at the center on the top face of the base plate 25 so as to face toward the base plate 25. FIG. 10 is a bottom view of the rotation plate 32; as apparent from FIG. 10, a plurality, or in the embodiment, four, of circular guide holes 32a for passing the 10 yen coins stored in the hopper 21 and guiding them onto the base plate 25 are formed in the rotation plate 32 with the same interval in the circumferential direction and with the same distance from the center of the rotation plate 32. As apparent from FIGS. 8, 9, the rotation plate 32 is fixedly secured to an output shaft 16c of a motor 16b serving as drive means attached with small screws 33 to the bottom face of the base plate 25 and is rotatively driven by operation of the motor 16b. FIG. 11 also shows the motor 16 and its manner of assembly. A flat faced slide ring 36 is provided between the rotation plate 32 and the base plate 25 as shown in FIGS. 8, 9 to make the rotation of the rotation plate 32 smooth against the base plate 25. As shown in FIG. 9, the rotation plate 32 is positioned to maintain clearance e between itself and the base plate 25 except the attachment portion to the output shaft 16c of the motor 16b. The clearance e is designed to be slightly larger than the thickness of the 10 yen coins 38 to be dispensed. Although in this embodiment, the coin feeder 16 handles 10 yen coins 38, the coin feeder 16 can be commonly used for other coins having different thickness, such as the 1 yen coins or the 500 yen coins, and therefore, the clearance e is designed to be slightly larger than the 500 yen coins, the thickest coins in Japanese currency.

Figure 7:
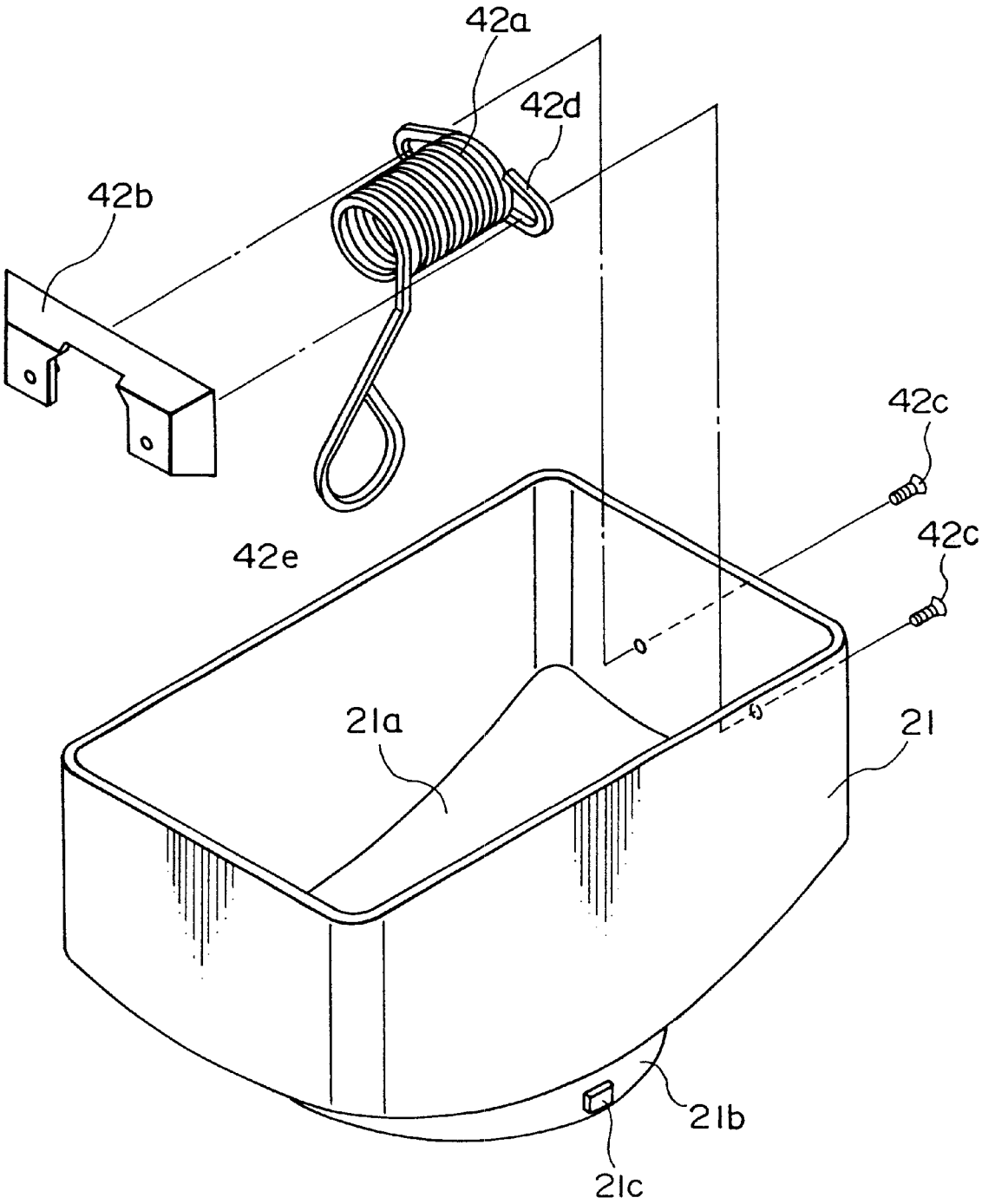
FIGS. 7, 8 are exploded perspective views, respectively, showing a part of the coin feeder shown in FIG. 6.
Figure 12:
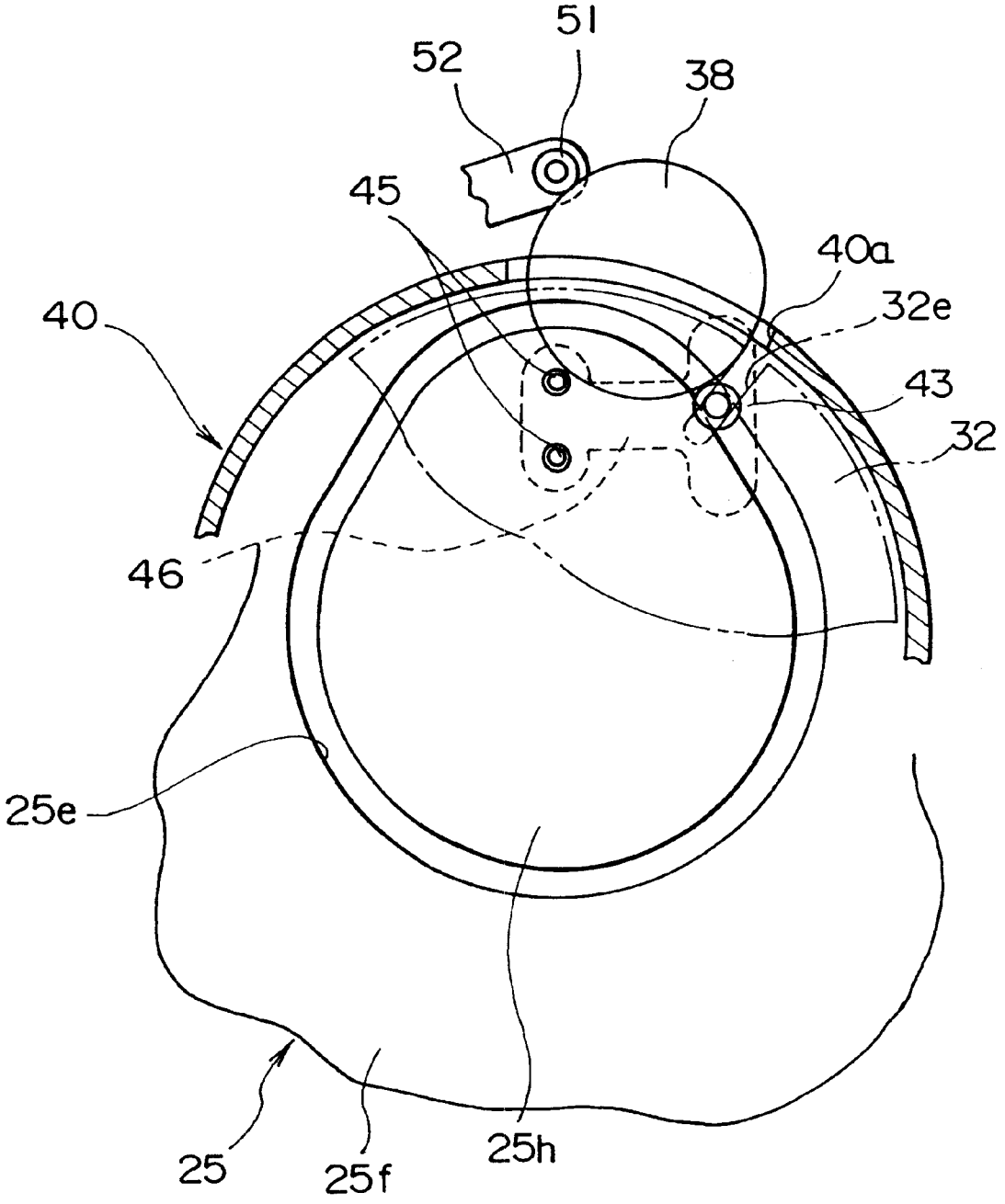
FIG. 12 is a plan view partially including a cross section of an essential part of the coin feeder shown in FIG. 6.

As shown in FIGS. 4, 6, 8, 9, 12, a cylindrical wall member 40 is arranged on the base plate 25 so as to surround the rotational plate 32 and is secured to the base plate 25 with small screws 41. As shown in FIGS. 8, 9, 12, an outlet 40a capable of passing the 10 yen coins 38 (and even the 500 yen coins) is formed at a lower portion of the wall member 40. The hopper 21 is attached to the wall member 40. Specifically, as shown in FIG. 7, a cylindrical fitting member 21b is formed at the bottom of the hopper 21; as shown in FIGS. 6, 9, the fitting member 21b is inserted in the wall member 40 and contacts a projection 40c formed on an inner round surface of the wall member 40, thereby being vertically positioned thereat. As shown in FIGS. 6, 7, a pair of stopper projections 21c in a rectangular shape is formed on the outer round surface of the fitting member 21b, and as shown in FIG. 8, a pair of L-shaped cut portions 40d is formed on the wall member 40 so as to correspond to the pair of the stopper projections 21c. That is, the fitting member 21b is fitted inside the wall member 40 while the stopper projections 21c are inserted in the upright extending portions of the L-shaped cut portions 40d, and then the hopper 21 is slightly rotated to engage the stopper projections 21c with the horizontally extending portions of the L-shaped cut portions 40d, thereby preventing the hopper 21 from coming out. With this constitution, the 10 yen coins 38 in the hopper 21 reach the rotation plate 32 through the wall member 40 and then fall into the guide holes 32a formed in the rotation plate 32 in conjunction with rotation of the rotation plate 32, thereby reaching the top of the base plate 25. As shown in FIGS. 4, 6, 7, a coil spring 42a is arranged in the hopper 21 and is attached to an inner surface of the hopper 21 with small screws 42c and an attachment plate 42b at one end 42d of the coil spring 42a. As apparent from FIG. 7, the other end 42e of the coil spring 42a is pending and will drop in a smoothing manner the respective 10 yen coins, which are gathered at the bottom of the hopper 21 and begin to move with the rotation plate 32 while being put on the rotation plate 32, piece by piece into the guide holes 32a.

To convey the 10 yen coins that have fallen in the guide holes 32a of the rotation plate 32 and have reach the top of the base plate 25, along the surface of the base plate 25 and to feed them through the outlet 40a formed at the wall member 40, the following constitution has been built. As shown in FIGS. 8 to 10, four arc conveyance projections 32c are formed on the bottom face of the rotation plate 32 at respective positions for conveying the 10 yen coins thus reaching the base plate 25 by horizontally pushing them. Those conveyance projections 32c are, specifically, as apparent from FIG. 10, formed along a virtual circle not shown having its virtual center located at the rotational center of the rotation plate 32 and passing through the centers of respective guide holes 32a. As also apparent from FIG. 9, those conveyance projections 32c are formed so as to have very small clearance between them and the surface of the base plate 25. The 10 yen coins that have fallen in the guide hole 32a of the rotation plate 32 are pushed by the respective conveyance projections 32c according to the rotation of the rotation plate 32 and conveyed on the base plate 25.

As shown in FIGS. 8 to 10, four guide grooves 32e are formed in the rotation plate 32 so as to position between any of two guide holes 32a. The guide grooves 32e, specifically, as apparent from FIG. 10, are formed so as to radially extend from the rotational center of the rotation plate 32 and so that each guide groover extends straight, and the guide groves have respective open ends at the outer periphery of the rotation plate 32. As shown in FIGS. 8 to 10, a pushing pin 43 serving as a pushing member for pushing the 10 yen coin toward the outlet 40a is loosely inserted in each guide groove 32e. Specifically, the pushing pin 43 is formed in a substantially cylindrical shape and slidably inserted by its top end 43a into the corresponding guide groove 32e as apparent from FIG. 9. The pushing pin 43 has a brim 43b at the middle thereof. The brim 43b engages the edge of the 10 yen coin and pushes the coin. The pushing pin 43 comes to push the 10 yen coin to the outside of the outlet 40a when positioned at the outer end of the guide groove, and the position in which the pin comes to push the coin is referred to as the pushing position.

Each pushing pin 43 can move between the pushing position and an isolation position at which the pushing pin 43 is isolated from the pushing position, according to the rotation of the rotation plate 32. As shown in FIGS. 8, 9, 12, a cam groove 25e is formed on the base plate 25. As apparent from FIG. 9, the lower end 43c of each pushing pin 43 is slidably fitted in the cam groove 25e. This cam groove 25e serves as moving means for the pushing pin. That is, as shown in FIG. 12, the cam groove 25e has a shape in that a part of a true circle is projected outside; the pinnacle of the projected part is designed to correspond to the outer end of the guide groove 32e; the true circle portion is designed to correspond to the inner end of the guide groove 32e. The cam groove 25e is formed, as shown in FIGS. 9, 11, 12, by attaching a cam plate 25h onto a recess 25g bored on the plate body 25f of the base plate 25. The cam plate 25h has an outer periphery a little smaller than the inner bore of the recess 25g. As apparent from FIG. 11 the cam plate 25h is positioned by fitting three positioning holes 25j formed in the cam plate 25h onto corresponding positioning bosses 25j projected from the plate body 25f, and is securely bolted to the plate body 25f with two small screws 33. The screws 33 are commonly used for bolting between the motor 16b described above and the base plate 25. As shown in FIG. 11, the cam plate 25h is also bolted to the plate body 25f around the projection portion by small screws 44a and nuts 44b.

As shown in FIGS. 8, 11, 12, limiter pins 45 are arranged near the outlet 40a formed at the wall member 40 to let the 10 yen coins 38 (see, FIG. 12) pass therethrough. As apparent from FIGS. 11, 12, the limiter pins 45 are arranged upright on a free end of a leaf spring 46 fixed to the bottom face of the base plate 25 at the other end thereof and are projected from the top face of the base plate 25 (or the cam plate 25h) through holes 25k, 25m (both shown in FIG. 11), which are coaxially formed respectively in the plate body 25f and the cam plate 25h. Since the leaf spring 46 can bend, the limiter pins 45 are movable up and down with respect to the top face of the base plate 25. As shown in FIG. 11, the leaf spring 46 is securely fixed to the base plate 25 using small screws 47 through the washers 48 and the coil springs 49. The limiter pins 45 engage the 10 yen coin 38 conveyed by pushing of the conveyance projection 32c of the rotation plate 32 to change the coin's direction toward the outlet 40a and further feed the 10 yen coin 38 to the outside of the outlet 40a in association with the pushing pins 43.

As shown in FIGS. 8, 11, 12, an outlet roller 51 is provided near the outlet 40a. The outlet roller 51 is arranged upright on an unrestricted end of an arm member 52 attached to the base plate 25 by a boss 52a and a small screw 52b so that the arm member can swing in a horizontal plane. A coil spring 53 is connected to the unrestricted end of the arm member 52 and urges the arm member 52 in a direction such that the outlet roller 51 comes close to the outlet 40a, or in a clockwise direction when viewed from the top. The outlet roller 51, as apparent from FIG. 12, contacts the 10 yen coin 38 fed by the pushing pin 43 and the limiter pins 45, from a side in opposition to those pins, thereby preventing the 10 yen coin from jumping out of the outlet 40a.

The coin feeder 16, though substantially the same as the other five coin feeders 11 to 15, is formed, as shown in FIG. 8, with a delivery detector 16a for detecting the feed of the 10 yen coin from the hopper 21 which serves as the storage portion. The delivery detector 16a is constituted as follows. As shown in FIG. 6, 8, the delivery detector 16a has a small bracket 55 aligned near the outlet 40a formed at the wall member 40 to feed the 10 yen coins 38 (see, FIGS. 9, 12) out. The small bracket 55 is fixed onto the top face of the base plate 25 with small screws 55a. A wall 55b extending upright is formed at one end of the small bracket 55; a photosensor 56 is secured to the wall 55b by small screws 57 shown in FIG. 13. The photosensor 56 includes a photo-emitting device for emitting light and a photo-receiving device for receiving the emitted light (both not shown), and produces a detection signal in response to the received light of the photo-receiving device.

Figure 13:
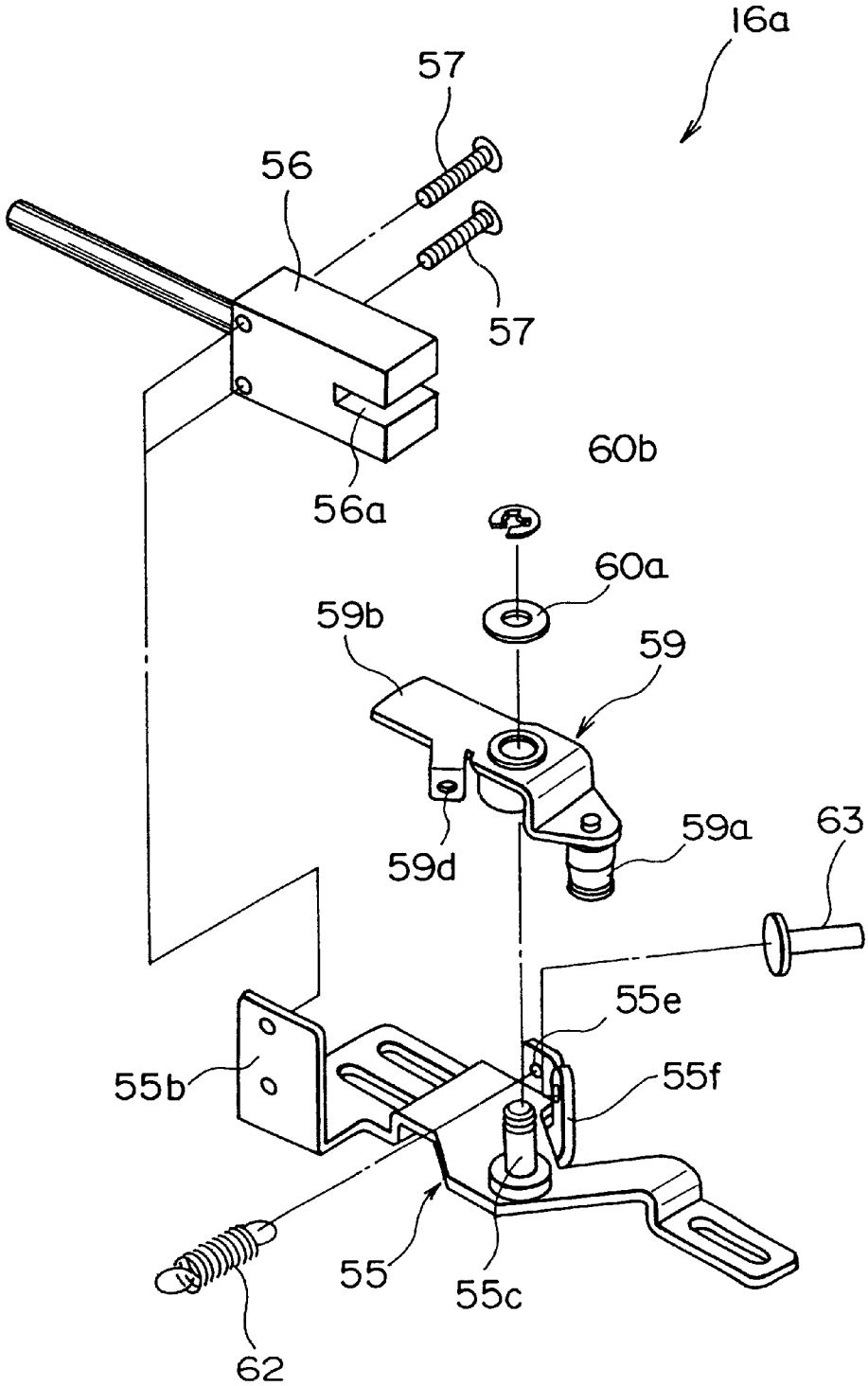
FIG. 13 is an exploded perspective view showing a part of the coin feeder shown in FIG. 6.

As apparent from FIG. 13, a support pin 55c is arranged upright at about the center of the small bracket 55; another arm member 59 is swingably or pivotally attached to the support pin 55c at its middle portion. The numerals 60a, 60b shown in FIG. 13 are a washer and a stopper ring, respectively, to prevent the arm member 59 from disengaging from the support pin 55c. A pin 59a is provided on a bottom face of the arm member 59 at its one end so that the 10 yen coin to be fed in a manner described above can engage with the pin 59a. The other end of the arm member 59 constitutes a photo-shielding portion 59b located between the photo-emitting device and the photo-receiving device of the photosensor 56 for shielding light incident to the photo-receiving device. A wall 59d bent downward and a wall 55e bent upward are formed at the arm member 59 and the small bracket 55. A coil spring 62 is suspended between both walls 59d, 55e. The coil spring 62 provides a biasing force for the arm member 59 in a clockwise direction. Another wall 55f extending upright is formed at the small bracket 55, and a stopper 63 is attached to the wall 55f. The rock of the arm member 59 is restricted within a predetermined range by engaging the stopper 63.

In operation of the coin feeder 16 thus constituted, which operates in a manner substantially the same as the other five coin feeder 11 to 15, it is now assumed that the hopper 21 mounted on the coin feeder 16 is storing many 10 yen coins. In this situation, a controller, or a CPU as described below, managing the operation control of the coin feeder 16, provides an operation command in response to a payout command signal sent out of a register not shown, thereby operating the motor 16b, so as to rotatably drive the rotation plate 32 in a counterclockwise direction. The respective 10 yen coins fall, sequentially from one located on the bottom side, into the guide holes 32a in the rotation plate 32 through the wall member 40 and reach the top of the base plate 25.

Regarding the feed operation of one piece of the 10 yen coins, the 10 yen coin that has reached the top of the base plate 25, is pushed by the conveyance projection 32 projected from the bottom face of the rotation plate 32 and conveyed on the base plate 25 according to the rotation of the rotation plate 32. The 10 yen coin thus conveyed by the conveyance projection 32c engages with the limiter pins 45 when reaching near the outlet 40a formed at the wall member 40 thereby being subject to a change of its original direction to one orienting toward the outlet 40a. As shown in FIG. 12, at about the same time of this directional change operation of the 10 yen coin, the pushing pin 43 that has traveled so as to pursue the 10 yen coin 38 according to the rotation of the rotation plate 32, then further travels from the true circle portion to the projected portion of the cam groove 25e, and is made to move, as the effect of the projection portion, along the guide groove 32e from the inside to the outside, or from the isolation position to the pushing position as described above. According to this operation, the 10 yen coin 38 is fed out through the outlet 40a so as to be squeezed out by the limiter pins 45 and the pushing pin 43 as shown in FIG. 12. The 10 yen coin 38 then engages the outlet roller 51 as shown in FIG. 12 and is smoothly fed out without jumping out.

The 10 yen coin 38 when fed out, also engages with the pin 59a formed on the arm member 59 (see, e.g. FIGS. 8, 13) described above and pushes the pin 59a. The arm member 59 is pivoted in the counterclockwise direction, so that the photo-shield portion 59b as a part of the arm member 59 comes into a gap 56a (see, FIG. 13) of the photosensor 56. The photo-shield portion 59b shields the light emitted from the photo-emitting device to the photo-receiving device of the photosensor 56, thereby producing the detection signal. The detection signal is transmitted to the controller, and the controller confirms the feed of the 10 yen coin according to the detection signal. Subsequently, the series of operations above will be repeatedly performed in substantially same manner for the 10 yen coins continuously falling into the respective guide holes 32a of the rotation plate 32. Finally, when the number of the fed 10 yen coins reaches a predetermined number, the controller produces a stop command and makes the motor 16b stop. That is the completion of coin feeding.

The transfer unit 22 (see, FIGS. 4, 6, 8) with which the coin feeder 16 thus constituted is equipped, can feed the coins up to the last completely, and contributes to make the coin receiving and dispensing apparatus compact since it is made compact with a smaller number of parts thereof. Although in this embodiment, in addition to the pushing pins 43 serving as pushing means, the conveyance projections 32c and further the limiter pins 45 are formed on the rotation plate 32, any of the pushing pins 43 solely could surely feed out the coins up to the last even if those conveyance projections 32c and the limiter pins 45 were omitted. At least one of the pushing pins 45 would be sufficient regardless the number of the guide holes 32a in the rotation plate 32. The pushing pins 43 as in this embodiment can be provided in the same number as the guide holes 32, but do not have to be in the same number.

The apparatus is equipped with carrying means for conveying various coins respectively fed out of the six coin feeders 11 to 16 as described above into the payout tray 6 formed at the delivery slot 3b shown in FIGS. 1 to 3, and the carrying means is constituted as follows. As shown in FIG. 5, where the coin feeder 11 to 16 are aligned in two lines, left and right, in each of which the three coin feeders are aligned in a back and forth direction, a belt 67 is formed so as to be positioned between both lines. As shown in FIGS. 2, 3, the belt 67 is endless and formed so as to extend among respective coin fed positions of the transfer units 22 of the coin feeders 11 to 15 and the delivery slot 3b. The various coins fed out of the respective coin feeders 11 to 16 are supported by this belt 67 and conveyed. As shown in FIG. 5, along both sides of the belt 67, there provide fence members 69 to prevent the coins being carried on the belt 67 from shifting crosswise and dropping off.

The belt 67 is wound around a pair of rollers 71, 72 provided rearward and forward. Those rollers 71, 72 are fitted to shafts 73, 74 rotatably attached to the fence members 69 by bearings; the rear roller 72 serves as a drive side; the front roller 71 serves as a driven side. As shown in FIGS. 3, 5, a small diameter driven sprocket wheel 76 is secured to one end of the shaft 74 onto which the roller 72 for the drive side is fitted. A motor 77 is provided near the shaft 74; a large diameter drive sprocket wheel 78 is secured to an output shaft 77a of the motor 77. A belt 79 with teeth is wound between the sprocket wheels 76, 78 as shown in FIG. 3. A belt drive mechanism for driving the belt 67 is constituted of both rollers 71, 72, both shafts 73, 74, both sprocket wheels 76, 78, the motor 77, and the belt 79 with teeth. That is, the roller 72 is rotatively driven by the operation of the motor 77 through the sprocket wheel 78, the belt 79 with teeth, and the sprocket wheel 76, thereby providing drive force to the belt 67 and driving the belt 67. As shown in FIGS. 2 to 4, an inclined guide 8a is formed at the upright frame 8 for guiding the respective coins conveyed by the belt 67 into the payout tray 6. A support 81 in a plate shape is formed for contacting a coin carrying portion of the belt 67 to support the coin carrying portion as shown in FIGS. 2, 3.

With the carrying means thus constituted, a cashier does not have to collect by herself or himself the various coins fed from the coin feeders 11 to 16 and can understand immediately and perform quickly the cashier's task. Use of the belt 67 for the carrying means as in this embodiment allows the coins fed from the respective coin feeders 11 to 16 to be conveyed with a high speed into the payout tray 6, thereby reducing the necessary time for cashier's task. It is to be noted that a chute which is inclined downwardly as it approaches the payout tray 6, in lieu of the belt 67, can be utilized as another constitution of the carrying means, and the various coins fed from the respective coin feeders 11 to 16 can be conveyed through the use of gravity. With such carrying means, no drive force producing mechanism, such as the motor 77 described above and whatever, is required, so that the entire apparatus can be made compact and inexpensive.

The following is a description of the constitution for receiving various coins inserted from the outside of the apparatus. As shown in FIGS. 4, 5, a coin dispenser 83 for receiving various coins inserted by the cashier or whoever through the coin entry opening 3a (see, FIGS. 1, 2) and for sequentially supplying them piece by piece on a gauge described below is disposed at a position shifted to one side on the front top of the horizontal frame 10 formed inside the casing 2 and is attached to the horizontal frame 10. The coin dispenser 83 has the following constitution, but is constituted in substantially the same fashion as the transfer unit 22 with which the coin feeder 16 is equipped, so that only its outline is described for the sake of brevity.

Figure 14:
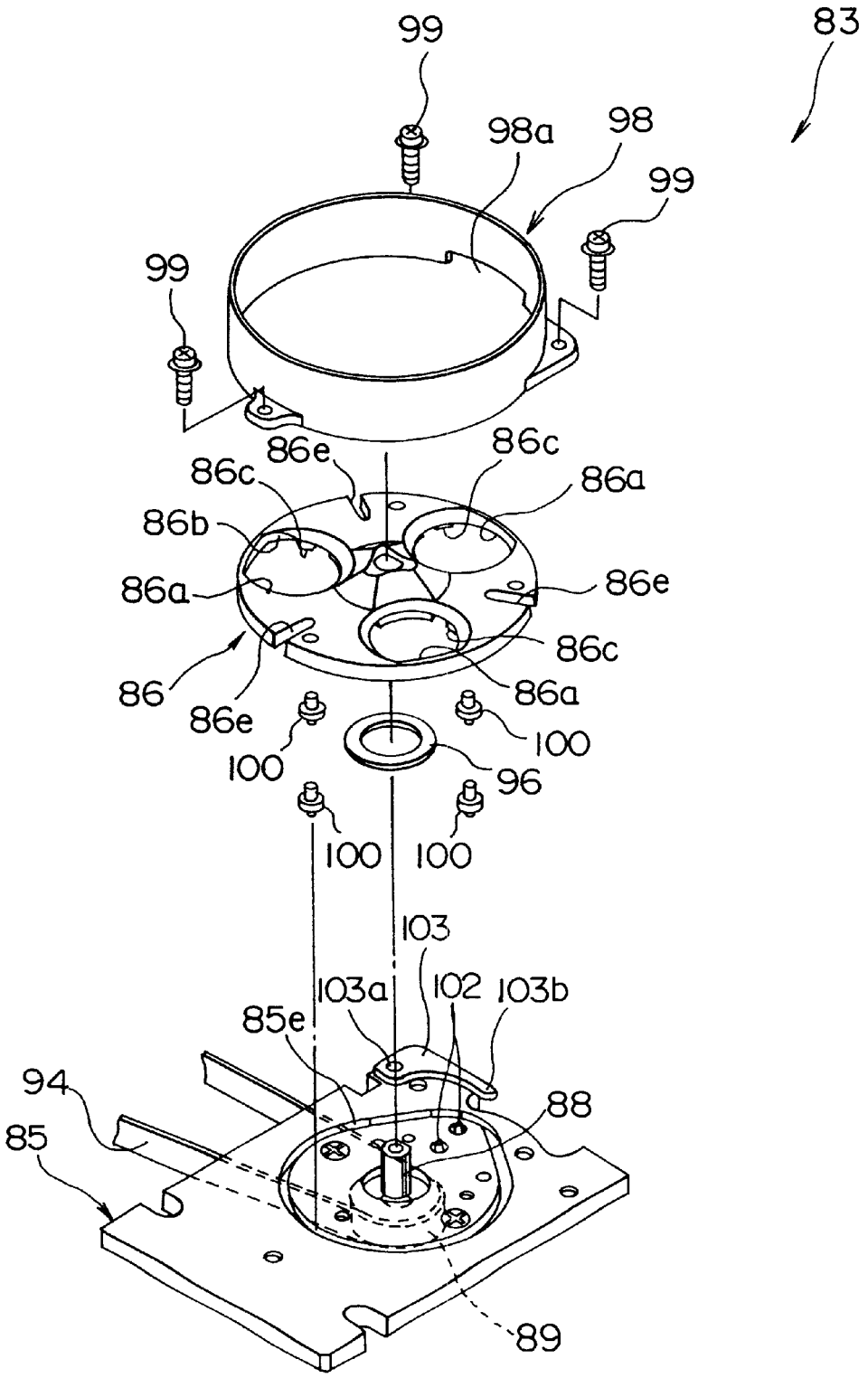
FIG. 14 is an exploded perspective view showing a coin dispenser incorporated in the inside mechanism shown in FIG. 4.

As also shown in FIG. 14, the coin dispenser 14 includes a substantially rectangular base plate 85. The base plate 85 is for slidably supporting the various coins. As shown in FIG. 14, a circular rotation plate 86 is arranged at about the center of the top face of the base plate 85 so as to face toward the base plate 85. The rotation plate 86 is omitted in FIGS. 4, 5. A plurality, or in this case, three, substantially circular guide holes 86a for passing various coins inserted from the coin entry opening 3a and guiding them onto the base plate 85 are formed in the rotation plate 86 with the same interval in the circumferential direction and with the same distance from the center of the rotation plate 86. The guide holes 86a accept all of the 1 yen coins, the 50 yen coins, the 5 yen coins, the 100 yen coins, the 10 yen coins, and the 500 yen coins, and in particular, as shown in FIG. 14, recesses 86b are formed so as to correspond to the smallest diameter of the 1 yen coins.

The rotation plate 86 is secured to the top end of a spindle 88 rotatably attached to the base plate 85. A small diameter sprocket wheel 89 is secured to the lower end of the spindle 88. A motor 91 is attached to the bottom side of the horizontal frame 10 around the coin dispenser 83; a large diameter sprocket wheel 92 is secured to the output shaft 91a (see FIG. 5) of the motor 91. A belt 94 with teeth is wound around both sprocket wheels 89, 92. That is, the spindle 88 is rotatively driven by operation of the motor 91 through the sprocket wheel 92, the belt 94 with teeth, and the sprocket wheel 89, thereby rotating the rotation plate 86. As shown in FIG. 14, a sliding ring 96 having a smooth flat surface is provided between the rotation plate 86 and the base plate 85 to make the rotation of the rotation plate 86 smooth against the base plate 85.

The rotation plate 86 is formed to keep a predetermined clearance between the rotation plate 86 and the base plate 85 except the attachment portion to the spindle 88. The clearance is designed to be slightly larger than the thickness of the 500 yen coin having the largest thickness among various coins to be inserted in the coin dispenser 83. As shown in FIGS. 4, 5, 14, a cylindrical wall member 98 is disposed on the base plate 85 so as to surround the rotation plate 86 and is secured to the base plate 85 with small screws 99 (see, FIG. 14). An outlet 98a through which the various coins mentioned above can pass is formed at the lower portion of the wall member 98. With the constitution described above, the various coins inserted from the outside through the coin entry opening 3a (see, FIG. 1) reach the rotation plate 86 via the inside of the wall member 98, and according to the rotation of the rotation plate 86, the various coins fall into the guide holes 86a formed in the rotation plate 86 and reach the top of the base plate 85.

The following constitution is provided to transfer along the surface of the base plate 85 the various coins that have fallen into the guide holes 86a formed in the rotation plate 86 and have reached the top of the base plate 85 as described above and to feed them out through the outlet 98a of the wall member 98. As shown in FIG. 14, three conveyance projections 86c are formed at respective positions on the bottom face of the rotation plate 86 for conveying the coins that have reached the base plate 25 as described above by horizontally pushing them. Those conveyance projections 86c are specifically formed in an arc shape along a virtual circle having its virtual center located at the rotational center of the rotation plate 86 and passing through the centers of respective guide holes 86a. Those conveyance projections 86c are formed so as to have a very small clearance between them and the surface of the base plate 85. The coins that have fallen in the guide hole 86a of the rotation plate 86 are pushed by the respective conveyance projections 86c according to the rotation of the rotation plate 86 and conveyed on the base plate 85.

Three guide grooves 86e are formed in the rotation plate 86 so as to be positioned between any of two guide holes 86a. The guide grooves 86e, specifically, are formed so as to radially extend from the rotational center of the rotation plate 86 and so that each guide groove extends straight, and the guide grooves 86e have respective open ends at the outer periphery of the rotation plate 86. A pushing pin 100 serving as a pushing member for pushing the coin toward the outlet 98a is loosely inserted in each guide groove 86e. Specifically, the pushing pin 100 is formed in a substantially cylindrical shape, disposed between the base plate 85 and the rotation plate 86, and slidably inserted by its top end 43a into the corresponding guide groove 86e. The pushing pin 43 has a brim at the middle thereof. The brim engages the edge of the coin and pushes the coin. The pushing pin 100 serves to push the coin to the outside of the outlet 98a when positioned at the outer end of the guide groove 86e, and the position is referred to as the pushing position.

Each pushing pin 100 can move between the pushing position and an isolation position at which the pushing pin 100 is isolated from the pushing position, according to the rotation of the rotation plate 86. As shown in FIG. 14, a cam groove 85e is formed on the base plate 85. The lower end of each pushing pin 100 is slidably fitted in the cam groove 85e. This cam groove 85e serves as moving means for the pushing pin. That is, as shown in FIG. 14, the cam groove 85e has a shape in that a part of a true circle is projected outside; the pinnacle of the projected part is designed to correspond to the outer end of the guide groove 86e; the true circle portion is designed to correspond to the inner end of the guide groove 86e.

Limiter pins 102 are disposed near the outlet 98a provided at the wall member 98 for passing the coins as described above. The limiter pins 102 are formed upright on an unrestricted end of a leaf spring (not shown) cantilevered to the bottom side of the base plate 86 and are projected from the top face of the base plate through holes bored in the base plate. The limiter pin 102 engage the various coins conveyed by pushing of the conveyance projection 86c of the rotation plate 86 to change the coins' direction toward the outlet 98a and further feed the coins to the outside of the outlet 98a in association with the pushing pins 100.

An arm member 103 is disposed around the outlet 98a and attached so as to be capable of rocking with respect to the horizontal plane against the base plate 85 around a support pin 103a. The arm member 103 contacts at its unrestricted end 103b the coins, fed out by the pushing pin 100 and the limiter pins 102, from a side in opposition to the side that those pins contact, thereby preventing the coins from jumping out therefrom. A spring (not shown) is connected to the arm member 103, so that the arm member 103 is urged in a direction so that its unrestricted end 103b comes close to the outlet 98a, or in the clockwise direction.

In operation of the coin dispenser 83, the motor 91 shown in FIGS. 4, 5 operates, thereby rotatively driving the rotation plate 86 in the counterclockwise direction. In this situation, various coins are inserted through the coin entry opening 3a (see, FIGS. 1, 2) by the cashier or whoever. Those coins fall into the guide holes 86a of the rotation plate 86 after passing through the wall member 98 and reach the top of the base plate 85.

Regarding one piece among plural coins that have been inserted, the coin that has reached the top of the base plate 85, is pushed by the conveyance projection 86c projected from the bottom face of the rotation plate 86 and conveyed on the base plate 85 according to the rotation of the rotation plate 86. The coin thus conveyed by the conveyance projection 86c engages with the limiter pins 102 when reaching near the outlet 98a formed at the wall member 98 thereby being subject to a change of its original direction to one orienting toward the outlet 98a. At about the same time of this directional change operation of the coin, the pushing pin 100 that has traveled so as to pursue the coin according to the rotation of the rotation plate 86, then further travels from the true circle portion to the projected portion of the cam groove 85e, and is made to move, as the effect of the projection portion, along the guide groove 86e from the inside to the outside, or from the isolation position to the pushing position as described above. According to this operation, the coin is fed out through the outlet 98a so as to be squeezed out by the limiter pins 102 and the pushing pin 100. The coin at that time engages the arm member 103 and is smoothly fed out without jumping out. Subsequently, the series of operations above are repeatedly performed for the respective coins that fall piece by piece into the respective guide holes 86a in the rotation plate 86.

Arranging the coin dispenser 83 prevents the coins from blocking each other at the coin entry opening 3a (see, FIG. 1), even if many coins are inserted at the same time by the cashier or the like. The coin dispenser 83 thus constituted can feed the inserted coin up to the last one and be made compact since it has a smaller number of parts, so that the coin dispenser 83 contributes to make the coin receiving and dispensing apparatus compact as a whole.

Sorting means for sorting, according to denominations, various coins supplied from the coin dispenser 83 above is formed and constituted as follows. The respective coins sorted by the sort means are stored in the respective hoppers as the storage portion with which the six coin feeders 11 to 16 are equipped as described above.

The sorting means has a disc-shaped gauge 111 shown in FIGS. 2 to 5. As apparent from FIGS. 4, 5, the gauge 111 is made of a steel plate or the like an original material and extends over the respective coin feeders 11 to 16. The gauge 111 has a ring shaped coin guide portion, which is attached to the horizontal frame 10 by legs 112 (see, FIG. 4). The coin guide portion includes a major coin face receiving face 111c tapered so that its diameter becomes shorter gradually as it approaches the bottom side, for receiving the major face of the coins, and an edge receiving portion 111d in continuation with the lower end of the receiving face 111c for receiving the edge of the coins. FIG. 4 shows a coin in a condition being guided along the receiving face 111c and the edge receiving face 111d, or in this case, the 10 yen coin 38. In this coin guide portion thus constituted, the tapered receiving face 111c prevents the coins from falling outward based on centrifugal force, and surely conveys and sorts them. When the coins are conveyed, conveyance resistance is lowered since the coins tend to move while rolling along the edge receiving face 111d, so that conveying means described below can be sufficient even if compact and without large power, and therefore, the apparatus can be made compact. Furthermore, since the gauge 111 is made of thin steel material, the entire apparatus can be made compact and light.

As shown in FIGS. 4, 5, plural, in this case, six of openings 111f, 111g, 111h, 111i, 111j, 111k are formed in the major face receiving face 111c along a circumferential direction. As shown in the drawings, those openings 111f to 111k are substantially rectangular, whose inner diameters in a longer edge direction, or lengths of the openings, are designed to be slightly larger than the diameters of the respective coins, or namely, the 1 yen coin, the 50 yen coin, the 5 yen coin, the 100 yen coin, the 10 yen coin, and the 500 yen coin. Those openings 111f to 111k are positioned corresponding to the coin feeders 11 to 16 equipped with the hoppers for storing the various coins according to the denominations as apparent from FIG. 5.

That is, various coins subsequently supplied from the coin dispenser 83 described above reach the gauge 111 and are conveyed along the coin guide portion of the gauge 111 by the conveying means described next, and during this conveyance, the various coins fall through any of the openings 111f to 111k having the respective inner diameters corresponding to the respective diameters of the various coins, and drop into and are stored at the respective hoppers. Although the horizontal frame 10 is located between the gauge 111 and the respective hoppers, openings 10a for allowing the falling coins to pass are formed in the horizontal frame 10 so as to correspond to the respective openings 111f to 111k as shown in FIGS. 4, 5. The openings 111f to 111k are aligned in the order of the sizes from the smallest diameter to the largest diameter, so that the various coins are to be contained in the respective designated storage portions without an error.

As shown in FIGS. 4, 5, insertion detectors 115 to 120 for detecting an insertion of a coin into the respective hoppers are disposed between the respective openings 111f to 111k of the gauge and the respective openings 10a formed in the horizontal frame 10 so as to correspond to those openings 111f to 111k and are attached to the horizontal frame 10 through respective small brackets 115a to 120a. Each of the insertion detectors 115 to 120 is constituted of a photosensor having a photo-emitting device and a photo-receiving device, and an actuator having at one end a photo-shielding portion for shielding light en-fitted from the photo-emitting device and to be incident to the photo-receiving device, and the insertion detectors 115 to 120 are disposed so that the other end of the actuator of each detector exists at the corresponding opening 111f to 111k. That is, when falling through the respective openings 111f to 111k, the various coins engage the corresponding actuators to operate them, thereby shielding light emitted from the photo-emitting device to the photo-receiving device, and thereby producing a detection signal. The detection signal is transmitted to the controller above, and the controller then confirms an insertion of a coin in response to this signal.

The numbers of inserted coins and coins fed out of the apparatus regarding this coin receiving and dispensing apparatus can be counted and managed sufficiently because, in addition to those insertion detectors 115 to 120, there are provided the delivery detectors (though only the delivery detector 16a incorporated in the coin feeder 16 is described above) for detecting the feed of coins out of the hoppers with which the coin feeders are equipped. Therefore, the balance can be confirmed immediately even during operation of the register, and as a result, calculation of proceeds would not require a long time as in the conventional way when the balance is checked after the shop is closed.

Next, conveying means is described for conveying along the coin guide portion of the gauge 111 the various coins supplied piece by piece onto the gauge 111 by the coin dispenser 83 described above. The conveying means has a disc 125 in a circular shape shown in FIGS. 2 to 5. The disc 125 is made of steel plate or the like, and is disposed coaxially with the coin guide portion above the gauge 111. A spindle 125b is fitted to the center of the disc 125 via a hub 125a so as to be pending therefrom, and the disc 125 is rotatably attached to the horizontal frame 10 by the spindle 125b. Specifically, as shown in FIGS. 2, 3, a boss 127 is fixed to the horizontal frame 10; a bearing 128 is provided between the boss 127 and the spindle 125b.

Plural, or in this case, twelve conveyance members 130 are attached with the same interval in the circumferential direction at the outer periphery of the disc 125. More specifically, as apparent from FIG. 3, fittings 131 are secured to the outer periphery of the disc 125 with small screws, and the conveyance members 130 are swingably attached at their one ends to the fittings 131 around and by the pins 130a. The pins 130a extend in a horizontal direction, so that the conveyance members 130 are swung or rocked in a vertical direction. The respective conveyance members 130 move along the coin guide portion of the gauge 111 in accordance with the rotation of the disc 125, contact the coins, and convey them. Therefore, as shown in FIGS. 3 to 5, a pushing portion 130b for contacting the edge of a coin and pushing the edge is formed around the center of each conveyance member 130 so as to be pending therefrom. As apparent from FIG. 3, the pushing portion 130b is positioned so as not to contact, with a clearance smaller than the thickness of the coin to be conveyed, the receiving face 111c of the gauge 111 for receiving the major face of the coins.

A small bag bearing 133 serving as a rolling body is arranged at an unrestricted end of each conveyance member 130. A spring 134 for urging each conveyance member 130 downward is provided as shown in FIG. 3. The ball bearing 133 rolls on the coin guide portion or, in this case, on the receiving face 111c, when each conveyance member 130 travels along the coin guide portion of the gauge 111. By adoption of this constitution, the clearance between the pushing portion 130b of each conveyance member 130 and the receiving face 111c of the gauge 111 is maintained always to be a constant, and the clearance is never widened even if the gauge 111 were deformed, so that conveyance errors due to a widened clearance are avoided. With this coin receiving and dispensing apparatus, the conveyance members 130 described above are formed, thereby directly pushing the coins to carry them, so that no coin will be left over, and so that all the coins are surely conveyed and sorted. The plural conveyance members 130 are arranged with the same intervals between them over the entire circumference of the coin guide portion of the gauge 111, and as a result, even though many coins are inserted from the outside of the apparatus, those coins would not be blocked and would be subsequently smoothly conveyed for sorting.

Each conveyance member 130 travels according to the rotation of the disc 125 supporting the conveyance members 130 by drive force generated by the motor 91 aforementioned and disposed, as drive force generating means, on the bottom side at the front end of the horizontal frame 10. A drive force transmission mechanism for transmitting the drive force that the motor 91 generates, to the disc 125, or each conveyance member 130, is provided and constituted as follows. As shown in FIGS. 4, 5, through a sprocket 92 for transmitting drive force to the coin dispenser 83 is secured to the output shaft 91a of the motor 91, a small diameter sprocket 137 is further secured to the upper position of the output shaft 91a. The hub 125a of the disc 125 serves as a sprocket, and a belt 138 with teeth is wound around the sprocket 137 and the hub 125a. As shown in FIGS. 2, 3, a flange 125d is fitted to the top end of the hub 125a, thereby preventing the belt 138 with teeth from falling off from the hub 125a.

The drive force transmission mechanism is constituted of the sprocket 137, the hub 125a serving as a sprocket, and the belt 138 with teeth. Conveyance member drive means for moving the respective conveyance members 130 along the coin guide portion of the gauge 111 is constituted of the drive force transmission mechanism, the motor 91 as drive force generating means, and the disc 125. The conveying means for conveying the respective coins supplied from the coin dispenser 83 onto the gauge 111 along the coin guide portion of the gauge 111, is constituted of the conveyance member drive means and the respective conveyance members 130. Moreover, the sorting means aforementioned is constituted of the conveying means and the gauge 111.

As apparent from the description above, the coin dispenser 83 described above operates by receiving drive force from the motor 91 primarily formed to move the respective conveyance members 130. That is, the single motor 91 is commonly used for moving the conveyance members and for driving the coin dispenser. Accordingly, the number of motors built in the coin receiving and dispensing apparatus is reduced, so that the entire apparatus can be made compact and can be made inexpensively. With this constitution, the movement of the conveyance members 130 and operation of the coin dispenser 83 are inevitably synchronized. If they are not synchronized, the pushing pin 100 (shown in FIG. 14) with which the coin dispenser 83 is equipped as for pushing coins and the conveyance member 130 may fall in a locked up situation with a coin sandwiched by them. However, in the coin receiving and dispensing apparatus according to the invention, both operate synchronously as described above, so that such a problem does not occur.

More specifically, the disc 125 onto which the conveyance members 130 are attached and the rotation plate 86, shown in FIG. 14, with which the coin dispenser 83 is equipped are synchronously rotatively driven with a predetermined rotation number ratio, based on the teeth number ratio of the sprockets 89, 92, 137 and the hub 125a. By adoption of this constitution, the pushing pins 100 with which the coin dispenser 83 is equipped and the conveyance members 130 completely synchronously operate, and the timing of synchrony can be flexibly set by changing the rotation number ratio properly. Accordingly, a situation wherein the pushing pin 100 and the conveyance member 130 are locked up by sandwiching a coin will never occur.

Figure 15:
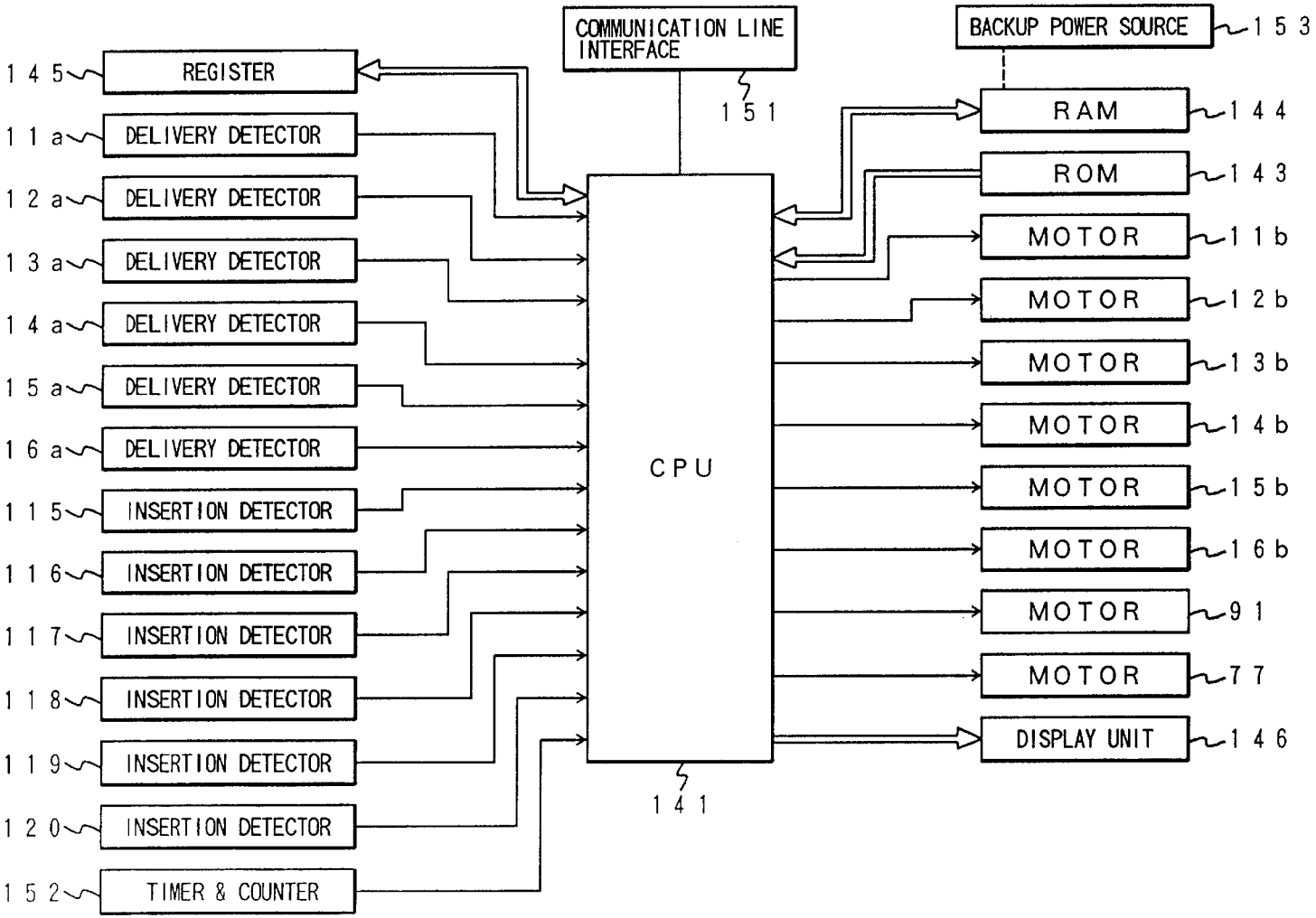
FIG. 15 is a block diagram showing an operation control system of the inside mechanism shown in FIG. 4.

FIG. 15 is a block diagram showing an operation-control system of the coin receiving and dispensing apparatus. In FIG. 15, what is to be included as in the control system among the respective elements described above is shown with reference numbers. That is, those are: the delivery detector 16a (see, FIGS. 8, 13) with which the coin feeder 16 (see, FIG. 4 to 16) is equipped for detecting the coin's feed; insertion detectors 115 to 120 (see, FIGS. 4, 5) provided for detecting insertions of various coins to the hoppers of the respective coin feeders 11 to 16; the motor 16b (see, FIG. 6) with which the coin feeder 16 is equipped; the motor 91 (see, FIGS. 4, 5) commonly used for traveling the conveyance members 130 and for driving the coin dispenser 83; the motor 77 for driving the belt 67 conveying toward the payout tray 6 various coins fed from the respective coin feeder 11 to 16. In FIG. 15, the reference numerals 11a to 15a indicate insertion detectors with which the other five coin feeders 11 to 15 are equipped, and which are substantially the same as the insertion detector 16a with which the coin feeder 16 whose constitution is specifically described is equipped. Similarly, the reference numerals 11b to 15b indicate motors with which other five coin feeder 11 to 15 are equipped, and which are substantially same as the motor 16b with which the coin feeder 16 whose constitution is specifically described is equipped.

In FIG. 15, the reference numeral 141 indicates a controller (hereinafter, referred as to a CPU) as a central processing unit organizing operation and control of the coin receiving and dispensing apparatus; the CPU 141 is connected to objects to be controlled and the respective detectors as shown in FIG. 15. As shown in FIG. 15, the CPU 141 provides commands to the objects to be controlled along a control program previously memorized in a ROM (Read Only Memory) 143 and data memorized in a RAM (Random Access Memory) 144. The CPU 141 is in communication with a register 145, and they mutually transmit and receive certain signals. The CPU 141 is also connected to a display unit 146 disposed at the front panel 3 (see, FIG. 1) and renders the display unit 146 to display certain indications. The RAM 144 is connected to a back-up power source 153.

The coin receiving and dispensing apparatus can implement various performances. Referring to FIGS. 17 to 21, flow charts, there describe those performances. As performance modes of the coin receiving and dispensing apparatus, there are three modes: first, a management mode for performing total payout, memory clarification, and the like are conducted; second, an operation mode for performing normal reception, normal payout, and the like; third, an maintenance mode for performing functional checks of respective portions, and those performance modes are set by key 150 shown in FIG. 1. Switching to the management mode or the operation mode except the maintenance mode alters functions of the respective switches, namely a select switch 146a, a clear switch 146b, and a start switch 146c, in the display unit 146 shown in FIG. 16. The reference numeral 146d represents an indicator composed of multicolor light-emitting diodes or the like displaying corresponding to respective denominations such as 1 yen, 5 yen, 10 yen, 50 yen, 100 yen, and 500 yen. Each indicator changes its color; it is red when the balance or remainder in the hopper of the corresponding coin feeder 11 to 16 is empty or almost empty; it is green when the balance in the hopper is normal; it is orange when the balance in the hopper is full or almost full, and those indicators show tip the conditions inside the hoppers further by going on or flashing them, so that such an indication of the conditions would be readily recognizable. The reference numeral 146e represents a liquid crystal display portion. The liquid crystal display portion displays balances of the respective denominations, payout amounts, error codes, and whatever.

Figure 17:
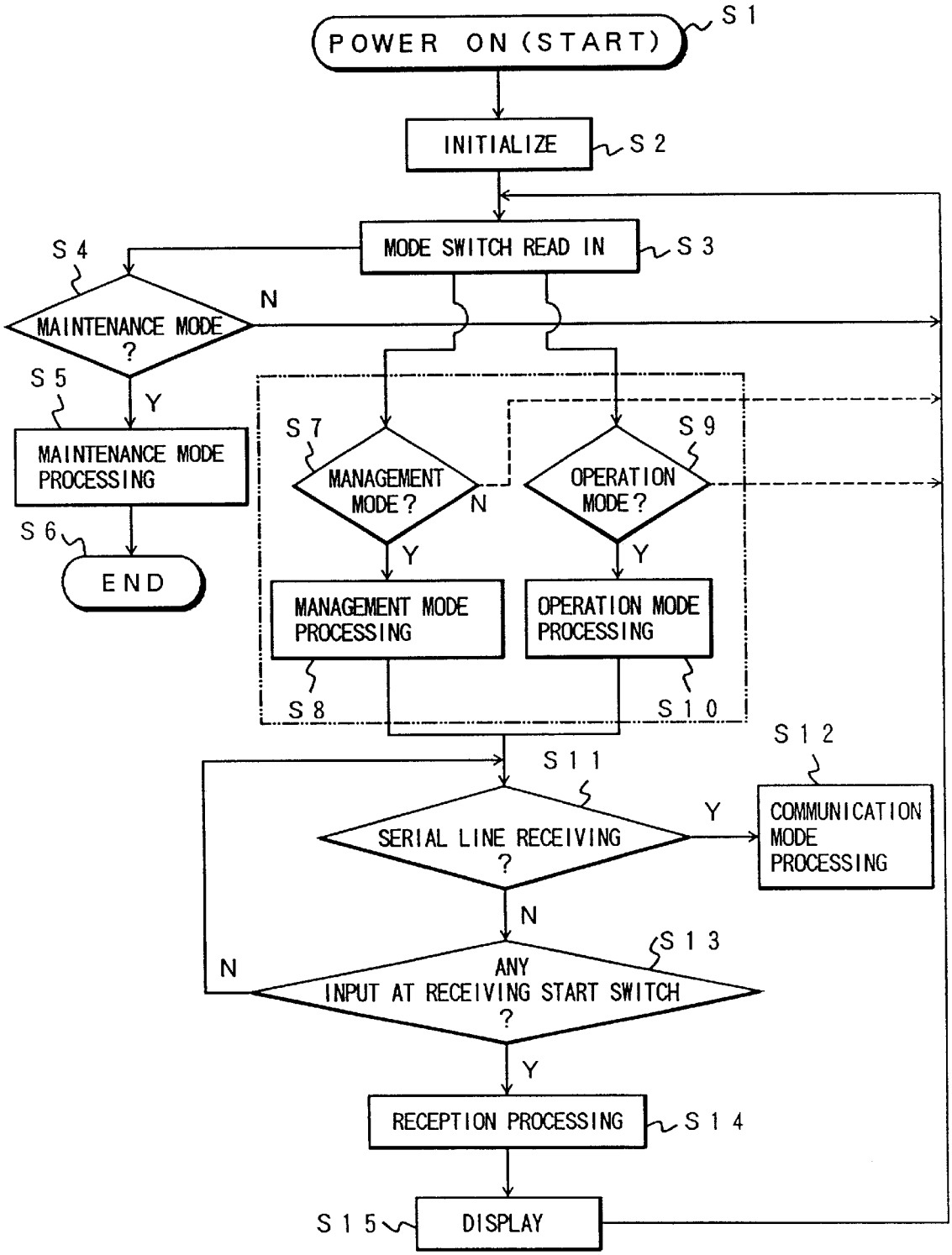
FIGS. 17 to 21 are flow charts showing: an initializing control; details of coin receiving processing in the flow chart in FIG. 17; a payout processing; motor locking detection and a processing when a motor locks; and also, motor locking detection and a processing when a motor locks, of the coin receiving and dispensing apparatus of a preferred embodiment according to the invention.

FIG. 17 is a flow chart showing an initial control of the coin receiving and dispensing apparatus according to the invention. First, when the power switch not shown of the coin receiving and dispensing apparatus is turned on (step S1), the apparatus starts up and the CPU 141 shown in FIG. 15 reads the program data from the ROM 143 and the RAM 144. The CPU 141 initializes with initial data settings by reading past data, or namely data managed as histories of coin numbers according to denominations as for conditions of input and output money, stored in, for example, the RAM 144 (step S2). Those past data are subsequently updated when exceeding memory's capacity. Then, one of the respective performance modes is selected using the key 150 for mode changing shown in FIG. 1. The performance modes are classified, as described above, into: first, the management mode; second, the operation mode; and third, the maintenance mode. Although the CPU 14 reads at a step for reading mode switches (step S3) as to which performance mode is selected, the situation wherein the maintenance mode is selected in FIG. 17 will be described first. The operation goes to step S4. A judgment is made as to whether the maintenance mode is selected (step S4). If the answer is Y (Yes) at this step (step S4), the maintenance mode processing is done (step S5), and if the answer is N (No), the operation returns to the mode switch reading step (step S3).

Figure 16:
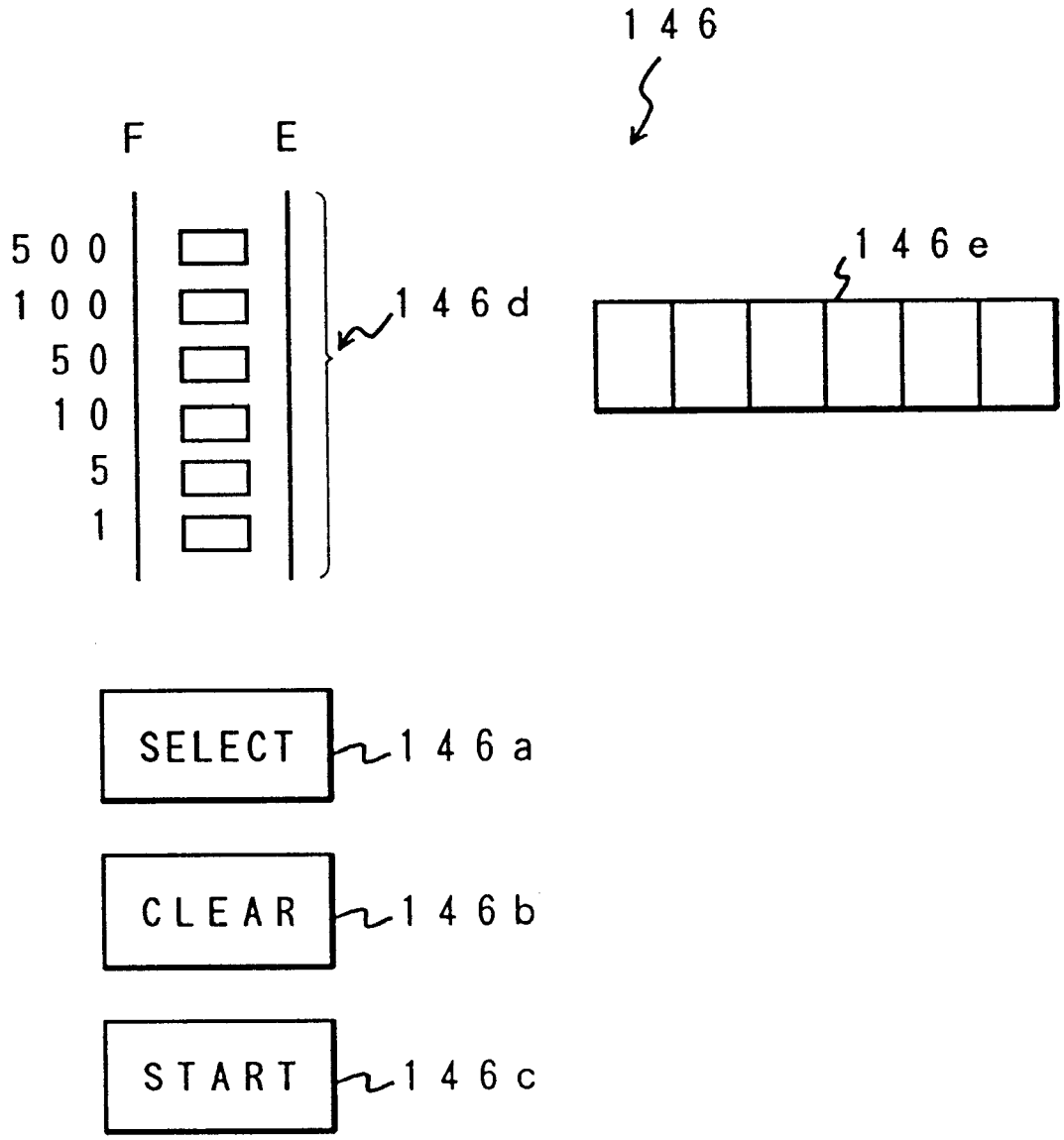
FIG. 16 is a diagram illustrating indicators disposed on a front panel of the coin receiving and dispensing apparatus shown in FIG. 1.

In this maintenance mode, all the indicators 146d shown in FIG. 16 go on. After confirming that all the indicators 146d go on, the operator also checks turning off of the light-emitting diodes by pushing the respective switches (select, clear, start) one by one. The operator then inserts six types coins of 1 yen, 5 yen, 10 yen, 50 yen, 100 yen, and 500 yen, at least one coin of each type, to the coin entry opening 3a shown in FIG. 1 and pushes an external switch to start operation of the coin dispenser 83 as a reception start. After reception starts, the following steps are automatically executed. During this procedure, the amount of the inserted coins is displayed for a while, for example, three seconds on the liquid crystal display portion 146e. After the amount of the inserted coins is displayed on the liquid crystal display portion 146e, the inserted coins are delivered by the coin feeders 11 to 16 shown in FIG. 5 according to their denominations. The amount of the delivered coins is displayed on the liquid crystal display portion 146e, and the operation ends (step S6). Thus, selection of the maintenance mode allows functional checks of the respective portions of the coin receiving and dispensing apparatus.

If as shown in FIG. 17 the management mode is selected by the key 150 for mode switching shown in FIG. 1, the operation is altered for the management mode at the mode switch reading step (step S3), and a judgment is made as to whether the management mode is selected (step S7). If the answer is Y (Yes) at this step (step S7), the management mode processing is done (step S8), and if the answer is N (No), the operation returns to the mode switch reading step (step S3).

When the management mode is selected, the functions of the respective switches (select, clear, start) are changed. That is, the select switch activates when pushed the respective indicators 146d turned on one by one, for example, in green light, in the order of denominations such as first 1 yen, second 5 yen, . . . and finally 500 yen, and activates the liquid crystal display portion 146e to display the balance in the hopper of each coin feeder 11 to 16 according to the selected denomination. The clear switch clarifies, when pushed, data of numbers and balances of the denomination selected by the select switch, or the past data in the RAM 144 shown in FIG. 15. The start switch starts the payout of the total number of coins, or the payout of all the coins in the hopper, selected by the select switch when pushed for a predetermined period, for example, two seconds. If the start switch is pushed again during the payout, the payout is stopped.

If as shown in FIG. 17 the operation mode is selected by the key 150 for mode switching shown in FIG. 1 the operation is altered for the operation mode at the mode switch reading step (step S3), and a judgment is made as to whether the operation mode is selected (step S9). If the answer is Y (Yes) at this step (step S9), the operation mode processing is done (step S9), and if the answer is N (No), the operation returns to the mode switch reading step (step S3).

If the operation mode is selected, though the functions of the respective switches (select, clear, start) are changed as well as the management mode, the normal reception and payout will be conducted in this operation mode. The select switch activates when pushed the respective indicators 146d turned on one by one, for example, in green light, in the order of denominations such as first 1 yen, second 5 yen, . . . and finally 500 yen for displaying conditions inside the respective hoppers, or the remainders. When the select or start switch does not receive any input within a predetermined time, for example, three seconds, the indicators 146d indicate the conditions inside the respective hoppers. After the denomination is selected by the select switch, if the start switch is pushed within a predetermined time, for example, three seconds, the apparatus can pay out the selected coins. For example, the apparatus is designed so that: if the period that the start switch is being pushed is less than two seconds, only a single coin is paid out; if the period that the start switch is being pushed is equal to or more than two seconds, ten coins are paid out. If the normal payout is done, the amount is displayed on the liquid crystal display portion 146e. After the input of the start switch, re-input is possible within a predetermined time, for example, three seconds, and the coins of the re-selected denomination can be paid in the same manner as above. While the indicators 146d indicate the coins' condition, the CPU 141 starts reception operation when the start switch is pushed. The belt 67 (shown in FIGS. 2, 3) operates for a predetermined time, for example, one second, at each time that the clear switch is pushed. This operation is for completely dispensing the coins when the coins are stuck inside.

When the management mode processing (step S8) or the operation mode processing (step S10) is conducted, a judgment is made at step S11 as to whether there is a reception of a serial line communication through a communication line interface 151 shown in FIG. 15. If there is the reception of the serial line communication, the operation shifts to a communication mode processing (step S12) as the first priority. In this communication mode processing, if there are changes or the like, or differences between sold amounts inputted from the register and amounts paid by the customers, as a result of computation at the register, the respective coin feeders 11 to 16 and the belt 67 are made to operate based on a payout command signal produced in response to the differences, and the proper change according to the denominations is dispensed to the recess 6a of the payout tray 6 shown in FIG. 1. If there is no reception of the serial line communication, or if the answer is N (No), a judgment is made as to whether there is any input of an external receiving start switch not shown (step S13). If there is no input of the receiving start switch, the operation returns to step S11; if there is some input of the receiving start switch, a coin receiving processing for the coin dispenser 83 shown in FIG. 14 will be done at step S14. When the coin receiving processing is going on, the liquid crystal display portion 146e shown in FIG. 16 displays certain amounts selected according to the denominations (step S15). After this display, the operation returns to step S13.

Figure 18:
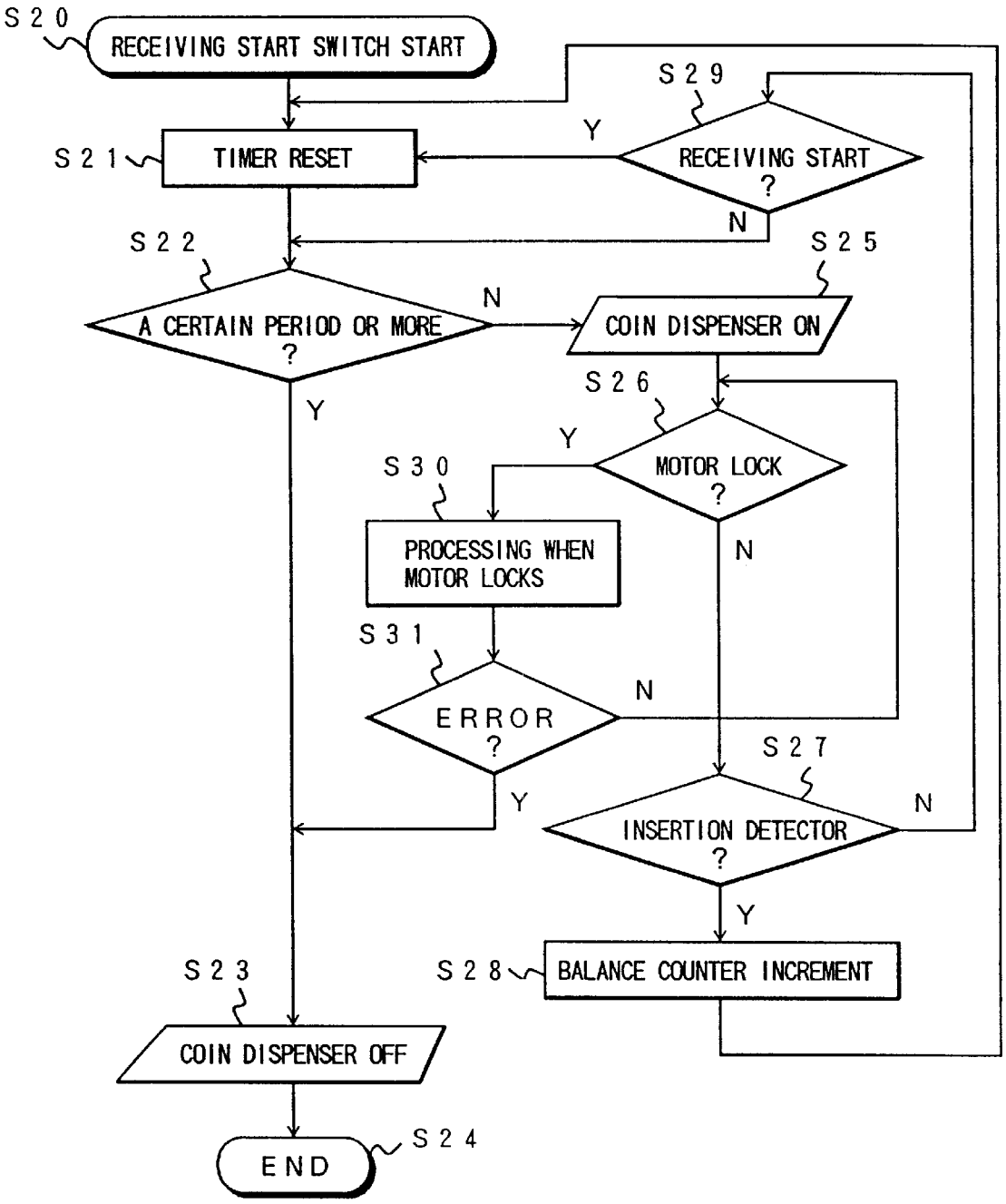

Next referring to a flow chart in FIG. 18, there describes the details of the coin receiving processing (step S14) shown in FIG. 17. First, if there is some input of the external receiving start switch not shown (steps S13, S20), a timer 152 shown in FIG. 15 is reset (step S21). A judgment is made (step S22) as to whether the coin dispenser 83 shown in FIG. 14 is operating for a predetermined time or more, for example, for five seconds or more; if the time is passed, the coin dispenser 83 shown in FIG. 14 is stopped (step S23); the operation then reaches the end (step S24). If the time is not passed, the coin dispenser 83 is made to operate for a certain time, and receives coins (step S25). Subsequently, a judgment is made as to whether the motor of the coin dispenser 83 is locking up (step S26); if the motor is not locked, coin detections are performed with respect to the denominations by the respective insertion detectors shown with reference numbers 115 to 120 (step S27) because the normal operation is going on. When the insertion detectors detect the coins, the balance counter in the counter shown in FIG. 15 is increased (step S28), and the operation returns to step S21 at which the timer is renewed and then repeats substantially same operations. Notedly, locking up of the motor is detected by an encoder not shown.

However, when no coin is detected at the insertion detectors (step S27), a judgment is made as to whether the external receiving start switch not shown is pushed again (step S29); if the receiving start switch has been pushed, or if the answer is Y, the operation returns to step S21 and resets the tinier; if the receiving start switch is not pushed, the operation returns to step S22, and then a judgment is made as to whether it has passed a predetermined time or more; and the CPU 141 repeats substantially same operations as above according to the flow shown in FIG. 18.

When at step S26 motor locking is detected, a processing when the motor locks as described below (step S30) is implemented, and then, the CPU 141 performs an error detection (step S31). At this error detection, if no error is made, the operation returns to step S26; if some error is made, the coin dispenser 83 is stopped, and the CPU 141 renders the liquid crystal display portion 146e shown in FIG. 16 display its error codes. All the error codes are designed to cease to be displayed upon mode changes at the key 150 shown in FIG. 1.

Figure 19:
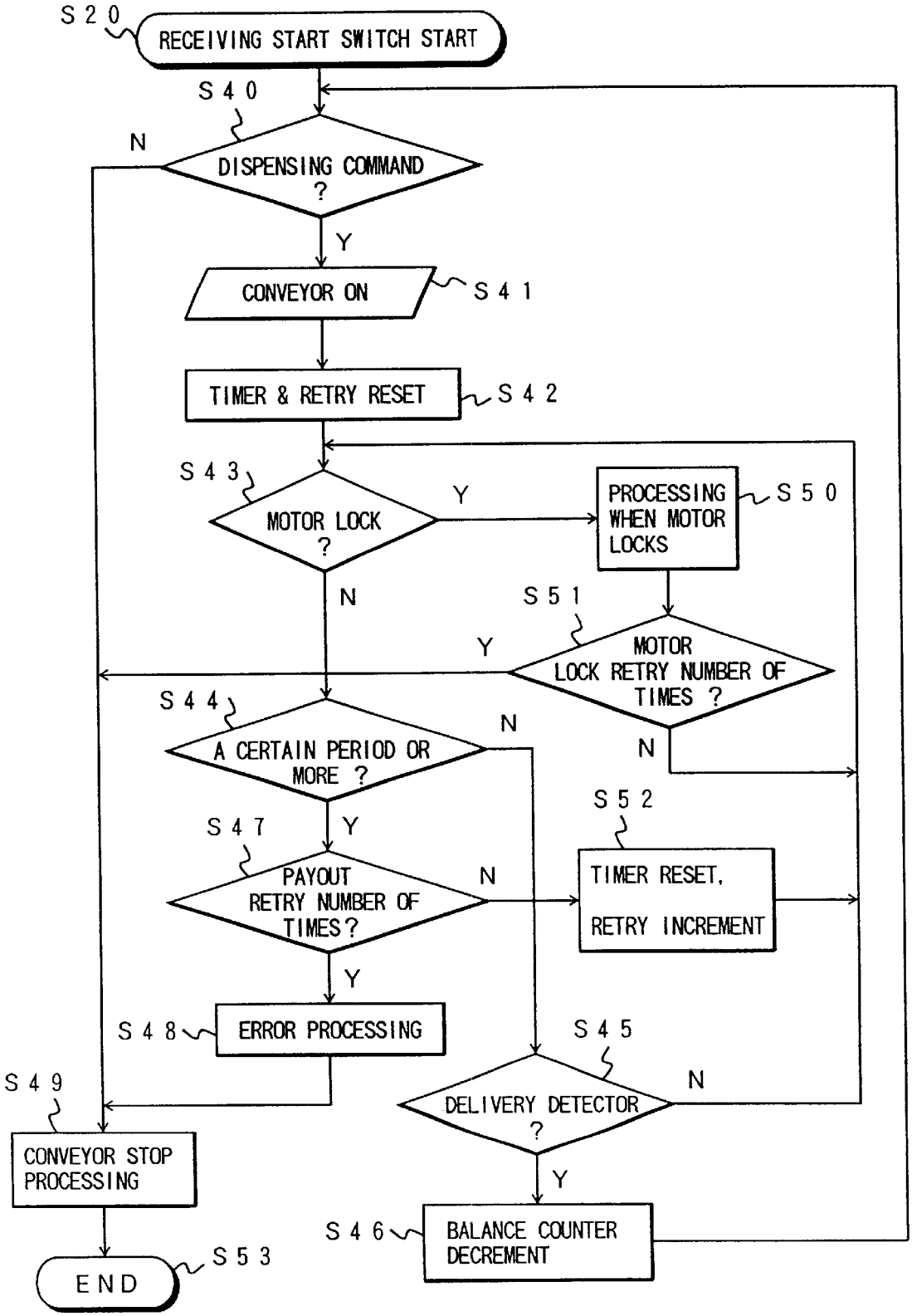

FIG. 19 shows a flow chart of a payout processing. As shown in FIG. 19, if the receiving start switch described above is pushed (step S20), a judgment is made as to whether the dispensing command exists (step S40). If no dispensing command is made, the CPU 141 operates the stop processing of the conveyance means including the belt 67 shown in FIGS. 2, 3 (step S49), and reaches the end (step S53). If there is a dispensing command, the conveyance means is turned on (step S41), and the CPU 141 resets the timer and counter 152 shown in FIG. 15 (step S42). At this step S4, a retry number of times as described below is also reset since it is counted in consideration of other occurrences. When the tinier and counter 152 are reset, a judgment is made as to whether the motor 16b (shown in FIG. 11) for the transfer unit 22 shown in FIG. 6 as for the coin dispenser locks (step S43). If this motor 16b does not lock, a judgment is made as to whether it passes a predetermined time or more (step S44); if it is within the predetermined time, a judgment is made as to whether the respective delivery detectors 11a to 16a of the coin feeders 11 to 16 detect any delivery of coins (step S45). If the delivery detectors 11a to 16a detect some delivery of coins, the balance counter is decreased since remaining coins in the hoppers are reduced (step S46). Then, the operation repeats judgment as to whether a dispensing command exists (step S40). If the delivery detectors 11a to 16a detect no delivery of coins, a judgment is made as to whether the motor 16b (shown in FIG. 11) for the transfer unit 22 regarding the coin dispenser 16 locks (step S43). If this motor 16b does not lock, a judgment is made as to whether it passes a predetermined time or more (step S44). If it passes the predetermined time or more, a judgment of the retry number of times for dispensing is made (step S47). That is, if the retry number of times for dispensing is within a predetermined number of times, the timer in the timer and counter 152 is reset; the retry number of times is counted; and the judgment at step S43 is repeated. If the retry number of times for dispensing is a predetermined number of times or more, the error processing is done (step S48); certain error codes are displayed on the liquid crystal display portion 146e; and the CPU performs the stop processing of conveying means (step S49) and ends its operation (step S53).

However, if the motor 16b of the transfer unit 22 is locked, the processing when the motor locks is implemented (step S50), and then, a judgment is made as to whether the motor locking occurs a predetermined number of times or more, or namely whether the processing when the motor locks is repeated the predetermined number of times or more (step S51). If it is with the predetermined number of times, a judgment at step S43 is made. If it is the predetermined number of time or more, the CPU performs the stop processing of conveying means (step S49) and ends its operation (step S53).

Figure 20:
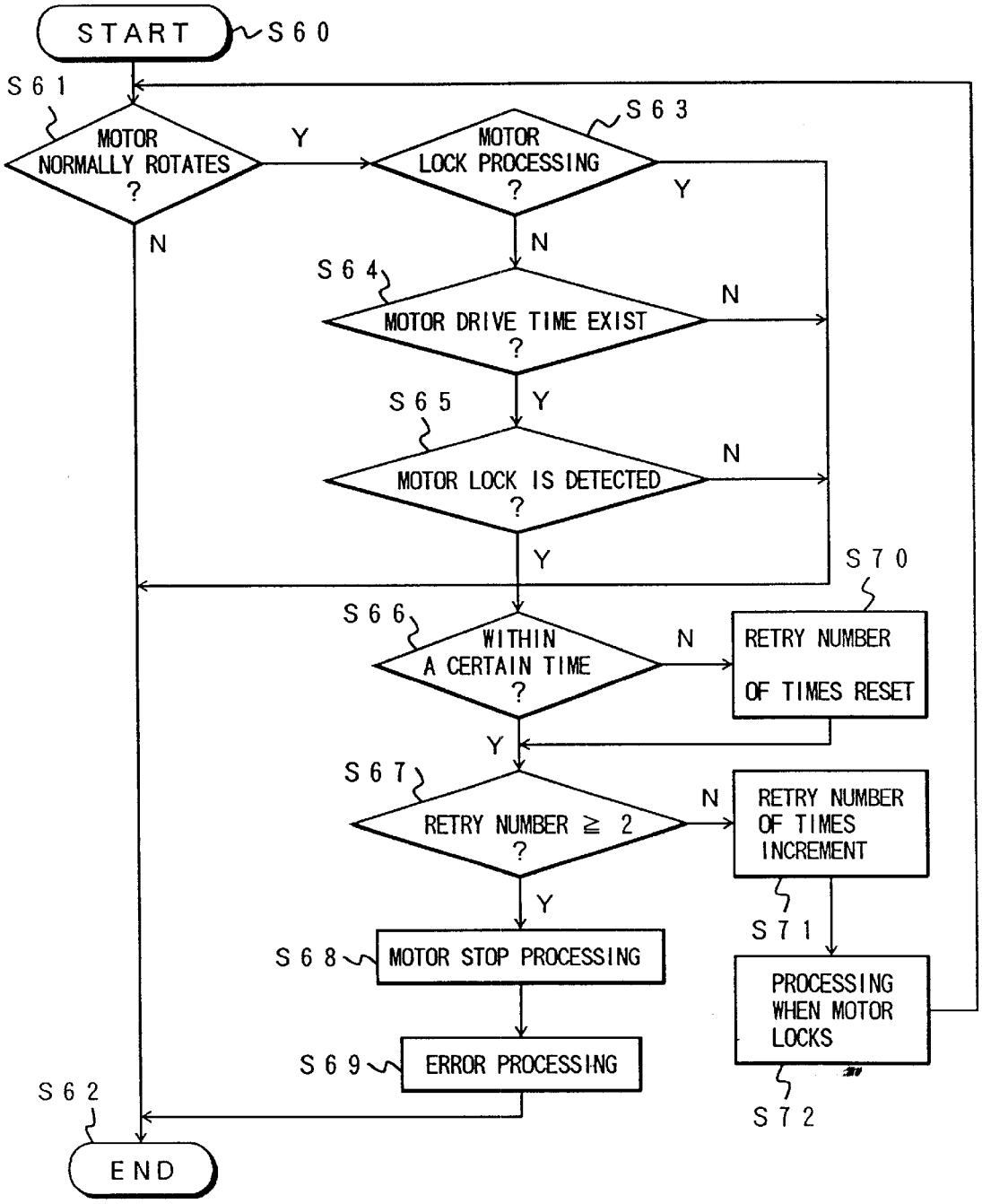
Figure 21:
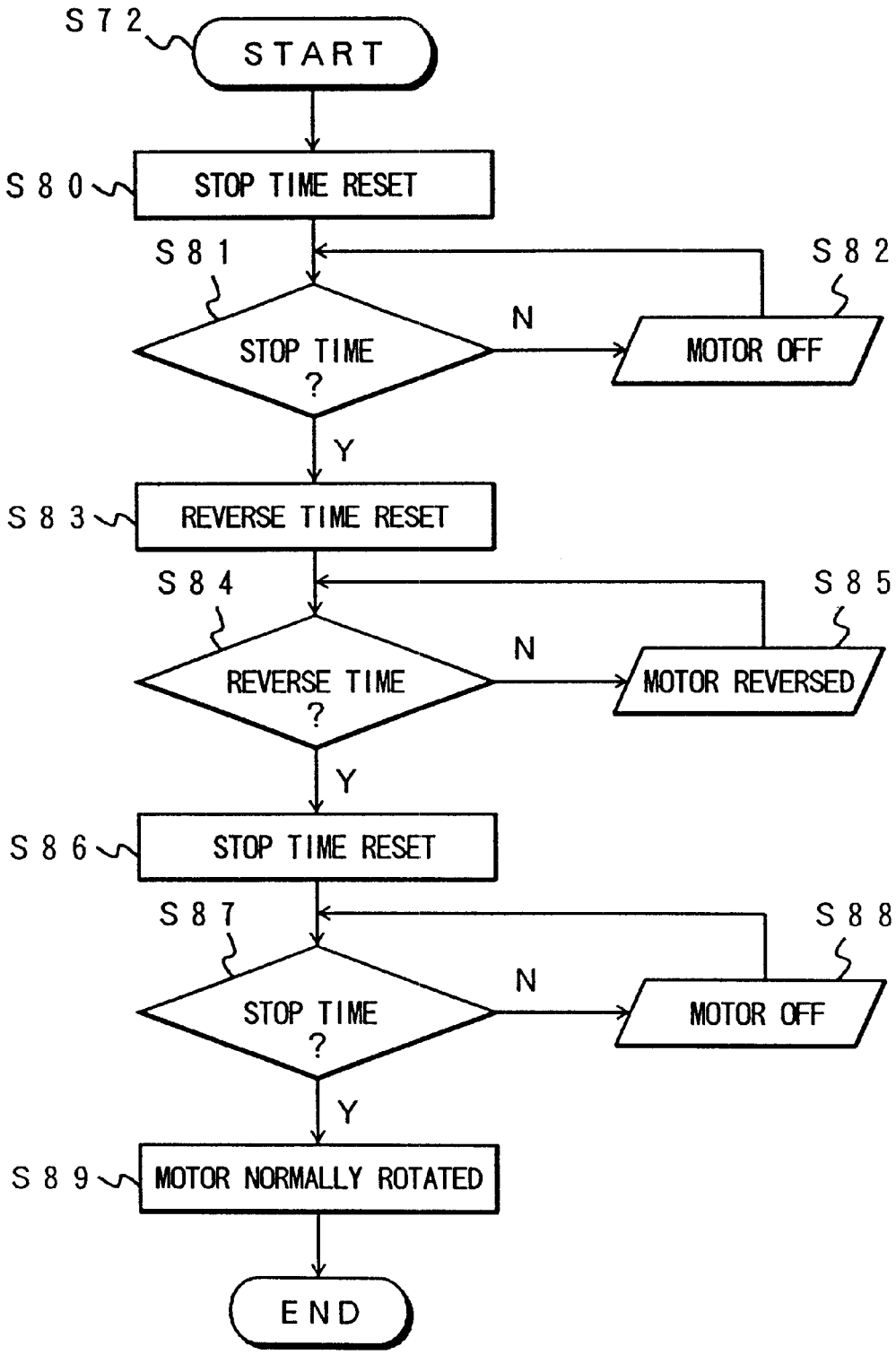

Referring to FIGS. 20, 21 there describes motor locking detection and the processing when a motor locks regarding the motor 91 shown in FIGS. 4, 5 and the motor 16b for the transfer unit 22. In this motor locking detection, the detection starts upon turning on of either the communication mode or the receiving start switch (step S60). A judgment is made as to whether the motor is rotating normally (step S61). If it is not during the normal rotation, or if it is the reversing rotation, no locking detection is made, and the operation goes to the end (step S62). In contrast, if the motor normally rotates, a judgment is made as to whether it is during the motor locking processing (step S63). If it is during the motor locking processing, no locking detection is made since the motor reversely rotates. If it is not during the motor locking processing, a motor drive time is judged (step S64); if there is not the motor drive time, no locking detection is made; if there is the motor drive time, the motor locking processing is conducted (step S66). If no motor locking is detected, the operation goes to the end. If the motor locking is detected, the CPU 141 calculates time from the start of the motor and the locking of the motor. If the calculation result is equal to or less than (or is simply less than) a predetermined time (step S66), the retry number of times is judged because it is assumed that the locking may occur out of the same place and the same causation (step S67). If the retry number of times is a predetermined times or more, the CPU 141 implements the motor stop processing (step S68) and the error pressing (step S68), and the operation goes to the end. If the retry number of times is the predetermined times or less, the retry number of times is increased (step S71); the CPU 141 implements the processing when the motor locks (step S71); and the operation returns to the judgment at step S61. If it passes the predetermined time according to the judgment at step S66, the retry number of times is reset because it is assumed that the locking may occur out of isolated places and separated causations (step S70), the operation returns to the judgment of the retry number of times (step S67).

When the operation enters the processing when the motor locks (step S72) in FIG. 20, the motor locking pressing starts (step S79) as shown in FIG. 21. The timer 152 shown in FIG. 15 resets the stop time (step S80), thereby stopping the motor for a predetermined time or less (step S82). This is for completely stopping the motor in consideration of motor's inertia or the like. If the stop time passes the predetermined time, the reversing time is reset (step S83); the motor is reversely rotated for a certain time and its reversing time is measured (steps S84, S85). That is, the motor is reversed by a certain angle. When the predetermined reversing time pauses, the stop time is reset (step S86); the motor is stopped for a predetermined time for the same reason above (step S88); after the predetermined time passes (step S87), the motor is normally rotated; and the processing ends (step S90).

As described above, with the coin receiving and dispensing apparatus according to the invention, if coins that are received by a cashier from customers in a food shop or the like are inserted into this apparatus, the coins are immediately sorted by the sorting means with respect to the denominations of the currency and stored at the respective storage portions. When the coins are paid out such as for change, the feeding means operates based on a dispensing command signal produced corresponding to the differences between the sold amount inputted in the register and the received amount from the customers to feed the coins of the wanted denomination in the necessary number.

By installing the coin receiving and dispensing apparatus thus constituted, transfer and reception of money with customers can be done in a very short period without worrying about transferring improper change, so that even where a person who has not yet got used to the register operation becomes a cashier, the register operation can be continued without delay.

With the coin receiving and dispensing apparatus according to the invention, the coin guide portion for guiding and sorting the various coins is in a ring shape, so that the gauge in which the coin guide portion is built is made compact, thereby making the apparatus compact, and thereby ensuring space for the cashier's task without reducing it.

With the coin receiving and dispensing apparatus according to the invention, a plurality of openings, respectively having inner diameters slightly larger than the diameter of a corresponding one among the various coins, formed at the coin guide portion, are formed so as to be placed in the order from the smallest to the largest of inner diameter sizes thereof. Therefore, the various coins are stored in legitimate storage portions without an error.

With the coin receiving and dispensing apparatus according to the invention the coin guide portion of the gauge is formed with a major face receiving face formed with the openings and tapered so that its diameter becomes shorter gradually as it approaches a bottom side, for receiving the major face of the coins, and an edge receiving portion in continuation with the lower end of the major face receiving face for receiving the edge of the coins. In this constitution, the tapered major face receiving face prevents the coins from falling outward based on centrifugal force, and surely conveys and sorts them. When the coins are conveyed, conveyance resistance is lowered since the coins tend to move while rolling along the edge receiving face, so that conveying means can be sufficient even if compact and without large power, and therefore, the apparatus can be made compact. Moreover, since the gauge can be made of thin steel material, the entire apparatus can be made compact and light.

Providing detectors for detecting the coins' insertion to and deliveries from the respective storage portions to manage the numbers of inserted coins and coins fed out, allows the balance to be confirmed immediately even during operation of the register, and as a result, calculation of proceeds does not require a long time as in the conventional way when the balance is checked after the shop is closed.

With the coin receiving and dispensing apparatus according to the invention, the conveying means includes a conveyance member arranged so as to be movable along the coin guide portion for conveying the coins in contact with the coins and conveyance member drive means for traveling the conveyance member. The conveyance member directly pushes the coins to convey them, so that all the coins are surely conveyed and sorted without mistakenly feeding the coins. The conveyance member is formed with a rolling body rolling on the coin guide portion. Accordingly, the clearance between the conveyance member and the coin guide portion is always maintained to be a constant, and the clearance is never widened even if the gauge were deformed, so that conveyance errors due to a widened clearance are avoided. The conveyance members are provided in a plural number across the whole length of the coin guide portion with substantially the same intervals therebetween. As a result, even if many coins are inserted from the outside of the apparatus, those coins are never stuck and are sequentially conveyed smoothly.

The coin receiving and dispensing apparatus according to the invention includes a coin dispenser for receiving coins inserted from the outside of the apparatus by a cashier or whoever and sequentially dispensing the coins, for example, one by one onto the gauge. Therefore, even if many coins are inserted at one time, those coins cannot be stuck at an inlet.

With the coin receiving and dispensing apparatus according to the invention, the conveyance member drive means for moving the conveyance members along the coin guide portion of the gauge includes drive force generating means such as a motor and drive force transmission means for transmitting the drive force generated by the drive force generating means to the conveyance member, and the coin dispenser operates by the drive force given from the drive force generating means. That is, the single drive force generating means is commonly used for moving the conveyance members and for driving the coin dispenser. Accordingly, the number of motors built in the coin receiving and dispensing apparatus is reduced, so that the entire apparatus can be made compact and can be made inexpensively. With this constitution, the movement of the conveyance members and operation of the coin dispenser are inevitably synchronized. If they are not synchronized, the pushing member with which the coin dispenser is equipped as for pushing coins and the conveyance member may fall in a locked up situation with a coin sandwiched by them. However, in the coin receiving and dispensing apparatus according to the invention, both operate synchronously as described above, so that such a problem does not occur.

Next, with the coin receiving and dispensing apparatus according to the invention, the coin dispenser includes: a base plate for slidably supporting the coins; a rotation plate disposed so as to face to the base plate, rotatably attached to the base plate, and formed with guide holes for guiding the coins onto the base plate; a wall member surrounding the rotation plate, formed with an outlet through which the coins can pass; pushing member arranged between the base plate and the rotation plate so as to be movable between a pushing position at which the coins are pushed toward the outlet and an isolation position isolated from the pushing position; and pushing member moving means for moving the pushing member to the pushing position and the isolation position based on the rotation of the rotation plate. The coin dispenser thus constituted can supply the coins up to the last without any coins remaining, and further has a smaller number of parts thereby making itself compact. Therefore, the coin dispenser contributes to make the entire apparatus compact.

With the coin receiving and dispensing apparatus according to the invention, conveying means includes a rotation member rotatably provided coaxially with the coin guide portion, formed with the conveyance member, and driven by the drive force generated by the drive force generating means, and the rotation plate of the coin dispenser and the rotation member of the conveying means are relatively driven in a synchronized manner with a predetermined rotation number ratio. By adoption of this constitution, the pushing member with which the coin dispenser is equipped and the conveyance members completely synchronously operate, and the timing of synchrony can be flexibly set by changing the rotation number ratio properly. Accordingly, a situation wherein the pushing member and the conveyance member are locked up by sandwiching a coin will never occur.

With the coin receiving and dispensing apparatus according to the invention, carrying means is provided for conveying the coins, fed out of the storage portions by the feeding means, toward an outlet. Therefore, the cashier does not have to collect the various coins fed out of the storage portions by the coin feeder and can immediately grasp the coins, thereby allowing the cashier's to perform their task quickly. As a specific example, the apparatus may include a belt extending among coin fed positions to which the feeding means feeds the coins and the outlet and being capable of supporting and carrying the coins, and belt drive means for driving the belt. According to this constitution, the coins fed out of the storage portions can be carried with high speed to the payout tray, so that the necessary time for cashier's task is shortened.

With the coin receiving and dispensing apparatus according to the invention, the coin feeder includes: a base plate for slidably supporting the coins; a rotation plate disposed so as to face the base plate, rotatably attached to the base plate, and formed with guide holes for guiding the coins onto the base plate; a wall member surrounding the rotation plate, formed with an outlet through which the coins can pass; pushing member arranged between the base plate and the rotation plate so as to be movable between a pushing position at which the coins are pushed toward the outlet and an isolation position isolated from the pushing position; and pushing member moving means for moving the pushing member to the pushing position and the isolation position based on the rotation of the rotation plate. The coin feeder thus constituted can supply the coins tip to the last without any coins remaining, and further has a smaller number of parts thereby making itself compact. Therefore, the coin feeder contributes to make the entire apparatus compact.

It is understood that although the present invention has been described in detail with respect to preferred embodiments thereof, various other embodiments and variations are possible to those skilled in the art which fall within the scope and spirit of the invention, and such other embodiments and variations are intended to be covered by the following claims.

What is claimed is:

1. A coin receiving and dispensing apparatus comprising:

a plurality of storage portions for storing respective coins;

sorting means for sorting coins inserted from the outside of the apparatus with respect to denominations of the currency of the coins and respectively feeding the sorted coins to said corresponding storage portions;

feeding means for feeding coins out of said storage portions to a user in response to a dispensing command; and said sorting means comprising a gauge having a coin guide portion extending over said storage portions, said coin guide portion being formed with a plurality of openings respectively having sizes slightly larger than the diameter of a corresponding coin of a particular denomination among the various coins of different denominations, so that each opening is sized to accept a coin of a different denomination, at positions corresponding to said respective storage portions, and comprising conveying means for conveying the coins that are disposed on said gauge along the coin guide portion, wherein said coin guide portion is substantially ring-shaped with an upper side and a bottom side and is formed with a receiving face, for receiving a major face of the coins, formed with said openings, which are arranged along a circumferential direction, and tapered so that the diameter of said coin guide portion decreases gradually toward the bottom side, for receiving the major face of the coins, and an edge receiving portion in continuation with a lower end of the receiving face for receiving the edge of the coins.

2. The coin receiving and dispensing apparatus as set forth in claim 1, wherein said respective openings are placed in the order from the smallest to the largest of the sizes thereof.

3. The coin receiving and dispensing apparatus as set forth in claim 1, wherein said gauge is made of steel plate material.

4. The coin receiving and dispensing apparatus as set forth in claim 1, wherein said storage portions include detecting means for detecting insertion of the coins to said storage portions and delivery of the coins from said storage portions.

5. The coin receiving and dispensing apparatus as set forth in claim 1, wherein said feeding means includes: a base plate for slidably supporting the coins; a rotation plate disposed so as to face said base plate; rotatably attached to the base plate, and formed with guide holds for guiding the coins onto the base plate; a wall member surrounding said rotation plate, formed with an outlet through which the coins can pass; a pushing member arranged between said base plate and said rotation plate so as to be movable between a pushing position at which the coins are pushed toward said outlet and an isolation position isolated from the pushing position; and pushing member moving means for moving said pushing member to said pushing position and said isolation position based on the rotation of said rotation plate.

6. The coin receiving and dispensing apparatus as set forth in claim 1, further comprising carrying means for conveying the coins, fed out of said storage portions by said feeding means, toward an outlet.

7. The coin receiving and dispensing apparatus as set forth in claim 6, wherein said carrying means includes a belt extending among coin fed positions, to which said feeding means feeds the coins to said outlet, and being capable of supporting and carrying the coins, and belt drive means for driving said belt.

8. The coin receiving and dispensing apparatus as set forth in claim 1, wherein said conveying means includes a conveyance member arranged so as to be movable along said coin guide portion for conveying the coins while in contact with the coins, and conveyance member drive means for driving said conveyance member.

9. The coin receiving and dispensing apparatus as set forth in claim 8, wherein said conveyance member is formed with a rolling body rolling on said coin guide portion.

10. The coin receiving and dispensing apparatus as set forth in claim 8, wherein a plurality of conveyance members are provided across the entire length of said coin guide portion and with substantially the same intervals therebetween.

11. A coin receiving and dispensing apparatus comprising:

a plurality of storage portions for storing respective coins;

sorting means for sorting coins inserted from the outside of the apparatus with respect to denominations of the currency of the coins and respectively feeding the sorted coins to said corresponding storage portions;

feeding means for feeding coins out of said storage portions to a user in response to a dispensing command;

said sorting means comprising a gauge having a coin guide portion extending over said storage portions, said coin guide portion being formed with a plurality of openings respectively having sizes slightly larger than the diameter of a corresponding coin of a particular denomination among the various coins of different denominations, so that each opening is sized to accept a coin of a different denomination, at positions corresponding to said respective storage portions, and comprising conveying means for conveying the coins that are disposed on said gauge along the coin guide portion, wherein said coin guide portion is substantially ring,shaped with an upper side and a bottom side and is formed with a receiving face, for receiving a major face of the coins, formed with said openings, which are arranged along a circumferential direction, and tapered so that the diameter of said coin guide portion decreases gradually toward the bottom side, for receiving the major face of the coins, and an edge receiving portion in continuation with a lower end of the receiving face for receiving the edge of the coins; and coin dispensing means for receiving coins inserted from the outside of the apparatus and sequentially dispensing the coins onto said gauge.

12. The coin receiving and dispensing apparatus as set forth in claim 11, wherein said coin dispensing means includes: a base plate for slidably supporting the coins; a rotation plate disposed so as face to said base plate, rotatably attached to the base plate, and formed with guide holes for guiding the coins onto the base plate; a wall member surrounding said rotation plate, formed with an outlet through which the coins can pass; a pushing member arranged between said base plate and said rotation plate so as to be movable between a pushing position at which the coins are pushed toward said outlet and an insolation position isolated from the pushing positions; and pushing member moving means for moving said pushing member to said pushing position and said isolation position based on the rotation of said rotation plate.

13. The coin receiving and dispensing apparatus as set forth in claim 11, wherein: said conveying means includes a conveyance member arranged so as to be movable along said coin guide portion for conveying the coins while in contact with the coins, and conveyance member drive means for driving said conveyance member; said conveyance member drive means includes drive force generating means and drive force transmission means for transmitting the drive force generated by said drive force generating means to said conveyance member; and said coin dispensing means operates by the drive force given from said drive force generating means.

14. The coin receiving and dispensing apparatus as set forth in claim 13, wherein said conveying means includes a rotation member rotatably provided coaxially with said coin guide portion, formed with said conveyance member, and driven by the drive force generated by said drive force generating means and wherein a rotation plate of said coin dispensing means and said rotation member of said conveying means are rotatively driven in a synchronized manner with a predetermined rotation number ratio.

15. A coin receiving and dispensing apparatus comprising:

a plurality of storage portions for storing respective coins;

sorting means for sorting coins inserted from the outside of the apparatus with respect to denominations of the currency of the coins and respectively feeding the sorted coins to said corresponding storage portions;

feeding means for feeding coins out of said storage portions to a user in response to a dispensing command; and said sorting means comprising a gauge having a coin guide portion extending over said storage portions, said coin guide portion being formed with a plurality of openings respectively having sizes slightly larger than the diameter of a corresponding coin of a particular denomination among the various coins of different denominations, so that each opening is sized to accept a coin of a different denomination, at positions corresponding to said respective storage portions, and comprising conveying means for conveying the coins that are disposed on said gauge along the coin guide portion, further comprising carrying means for conveying the coins, fed out of said storage portions by said feeding means, toward an outlet, wherein said carrying means includes a belt extending among coin fed positions, to which said feeding means feeds the coins to said outlet, and being capable of supporting and carrying the coins, and belt drive means for driving said belt.

16. A coin receiving and dispensing apparatus comprising:

a plurality of storage portions for storing respective coins;

sorting means for sorting coins inserted from the outside of the apparatus with respect to denominations of the currency of the coins and respectively feeding the sorted coins to said corresponding storage portions;

feeding means for feeding coins out of said storage portions to a user in response to a dispensing command; and said sorting means comprising a gauge having a coin guide portion extending over said storage portions, said coin guide portion being formed with a plurality of openings respectively having sizes slightly larger than the diameter of a corresponding coin of a particular denomination among the various coins of different denominations, so that each opening is sized to accept a coin of a different denomination, at positions corresponding to said respective storage portions, and comprising conveying means for conveying the coins that are disposed on said gauge along the coin guide portion, wherein said feeding means includes: a base plate for slidably supporting the coins; a rotation plate disposed so as to face said base plate, rotatably attached to the base plate, and formed with guide holes for guiding the coins onto the base plate; a wall member surrounding said rotation plate, formed with an outlet through which the coins can pass; a pushing member arranged between said base plate and said rotation plate so as to be movable between a pushing position at which the coins are pushed toward said outlet and an isolation position isolated from the pushing position; and pushing member moving means for moving said pushing member to said pushing position and said isolation position based on the rotation of said rotation plate.

17. A coin receiving and dispensing apparatus comprising:

a plurality of storage portions for storing respective coins;

sorting means for sorting coins inserted from the outside of the apparatus with respect to denominations of the currency of the coins and respectively feeding the sorted coins to said corresponding storage portions;

feeding means for feeding coins out of said storage portions to a user in response to a dispensing command;

said sorting means comprising a gauge having a coin guide portion extending over said storage portions, said coin guide portion being formed with a plurality of openings respectively having sizes slightly larger than the diameter of a corresponding coin of a particular denomination among the various coins of different denominations, so that each opening is sized to accept a coin of a different denomination, at positions corresponding to said respective storage portions, and comprising conveying means for conveying the coins that are disposed on said gauge along the coin guide portion; and coin dispensing means for receiving coins inserted from the outside of the apparatus and sequentially dispensing the coins onto said gauge, wherein said coin dispensing means includes: a base plate for slidably supporting the coins; a rotation plate disposed so as to face said base plate, rotatably attached to the base plate, and formed with guide holes for guiding the coins onto the base plate; a wall member surrounding said rotation plate, formed with an outlet through which the coins can pass; a pushing member arranged between said base plate and said rotation plate so as to be movable between a pushing position at which the coins are pushed toward said outlet and an isolation position isolated from the pushing position; and pushing member moving means for moving said pushing member to said pushing position and said isolation position based on the rotation of said rotation plate.

*18. A coin receiving and dispensing apparatus having a common delivery means for delivering coins to an outlet comprising:*

*a case having a base plate;*

*a plurality of storage portions for storing respective coins;*

*sorting means for sorting coins inserted in the apparatus and respectively feeding the sorted coins to said corresponding storage portions;*

*said sorting means comprising a gauge having a coin guide portion extending over said storage portions, said coin guide portion being formed with a plurality of openings of increasing size so as to sort the coins according to the diameters thereof, each opening corresponding to a respective storage portion, wherein said coin guide portion is substantially ring-shaped with an upper side and a bottom side and is formed with a receiving face, for receiving a major face of the coins, formed with said openings, which are arranged along a circumferential direction, and tapered so that the diameter of said coin guide portion decreases gradually toward the bottom side, for receiving the major face of the coins, and an edge receiving portion in continuation with a lower end of the receiving face for receiving the edge of the coins;*

*feeding means for feeding coins out of said storage portions to a user in response to a dispensing command;*

*conveying means for conveying coins along the coin guide portion; and*

*wherein said storage portions are adapted to store respective coins in a loose condition, and are disposed in a substantially planar arrangement around said common delivery means fixedly positioned with respect to said base plate for delivering thus-fed coins to an outlet.*

*19. A coin receiving and dispensing apparatus comprising:*

*a case having a base plate;*

*a plurality of storage mechanisms for storing and dispensing respective coins, each storage mechanism comprising a storage hopper that is adapted to store respective coins in a loose condition and a coin dispensing mechanism that is disposed below said storage hopper and is operative to feed the loose coins from the corresponding storage hopper to a respective output in response to a dispensing command;*

*sorting means for sorting coins inserted in the apparatus and respectively feeding the sorted coins to said corresponding storage mechanisms, said sorting means comprising a gauge having a coin guide portion extending over said storage mechanisms, said coin guide portion being formed with a plurality of openings of increasing size so as to sort the coins according to the diameters thereof, each opening corresponding to a respective storage mechanism, wherein said coin guide portion is substantially ring-shaped with an upper side and a bottom side and is formed with a receiving face, for receiving a major face of the coins, formed with said openings, which are arranged along a circumferential direction, and tapered so that the diameter of said coin guide portion decreases gradually toward the bottom side, for receiving the major face of the coins, and an edge receiving portion in continuation with a lower end of the receiving face of receiving the edge of the coins;*

*conveying means for conveying coins along said coin guide portion; and*

*delivering means fixedly disposed with respect to said base plate to receive the coins output by said dispensing mechanisms for delivery thus-fed coins to an outlet;*

*wherein said storage mechanisms are disposed in a substantially planar arrangement around said delivery means.*

* * * * *